(12) United States Patent
Renjith et al.

(10) Patent No.: US 11,580,165 B2
(45) Date of Patent: Feb. 14, 2023

(54) EVENT PRODUCER SYSTEM OF A MESSAGING PLATFORM FOR DELIVERING REAL-TIME MESSAGES

(71) Applicant: Twitter, Inc., San Francisco, CA (US)

(72) Inventors: Rishi Renjith, San Francisco, CA (US); Mirela Anghel, San Francisco, CA (US); Kevin Goodier, San Francisco, CA (US); George Leontiev, San Francisco, CA (US); Daithi O Crualaoich, San Francisco, CA (US); Tom Ashworth, San Francisco, CA (US); Sol Plant, San Francisco, CA (US); Andreas Savvides, San Francisco, CA (US); Guillaume Marty, San Francisco, CA (US); Ralph Cowling, San Francisco, CA (US); Leonardo Andres Garcia Crespo, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/669,044

(22) Filed: Oct. 30, 2019

(65) Prior Publication Data
US 2021/0044549 A1  Feb. 11, 2021

Related U.S. Application Data

(60) Provisional application No. 62/883,633, filed on Aug. 6, 2019.

(51) Int. Cl.
*G06F 15/16* (2006.01)
*G06F 9/54* (2006.01)
(Continued)

(52) U.S. Cl.
CPC ........ *G06F 16/90324* (2019.01); *G06F 9/546* (2013.01); *G06F 16/9024* (2019.01);
(Continued)

(58) Field of Classification Search
CPC . G06F 16/90324; G06F 9/546; H04L 51/046; H04L 51/16
(Continued)

(56) References Cited

U.S. PATENT DOCUMENTS

| | | | |
|---|---|---|---|
| 8,949,348 B2 * | 2/2015 | Banks | G06Q 10/06 709/206 |
| 9,646,028 B2 | 5/2017 | Schrock et al. | |

(Continued)

OTHER PUBLICATIONS

Sangyoon Oh, Jai-Hoon Kim, Geoffrey Fox, Real-time performance analysis for publish/subscribe systems, vol. 26, Issue 3, 2010, (Year: 2010).*

(Continued)

*Primary Examiner* — Hamza N Algibhah
(74) *Attorney, Agent, or Firm* — Brake Hughes Bellermann LLP

(57) ABSTRACT

This disclosure relates to streaming real-time messages over time to client applications according to query subscriptions that match content from a large stream of messages exchanged on a messaging platform in a manner that increases the speed of message delivery, effectively controls the management of computer resources to handle the fluctuation of the number of active query subscriptions, and/or increases the security of matching the query subscriptions against messages generated from the perspective of the authors while delivering those messages in real-time from the perspective of the users that initiated the query subscriptions.

18 Claims, 15 Drawing Sheets

(51) Int. Cl.
  *H04L 29/06* (2006.01)
  *G06F 16/9032* (2019.01)
  *H04L 51/046* (2022.01)
  *H04L 51/00* (2022.01)
  *G06F 16/901* (2019.01)
  *G06F 16/9536* (2019.01)
(52) U.S. Cl.
  CPC ........ *G06F 16/9536* (2019.01); *H04L 51/046* (2013.01); *H04L 51/16* (2013.01)
(58) Field of Classification Search
  USPC ........................................................ 709/203
  See application file for complete search history.

(56) References Cited

U.S. PATENT DOCUMENTS

| | | | | |
|---|---|---|---|---|
| 9,948,739 | B2* | 4/2018 | Spivey | H04L 67/26 |
| 9,960,928 | B1* | 5/2018 | Pope | H04N 21/64322 |
| 10,409,650 | B2* | 9/2019 | Zhao | G06F 9/5083 |
| 11,089,133 | B1 | 8/2021 | Patel et al. | |
| 2005/0021836 | A1* | 1/2005 | Reed | G06F 9/542 709/238 |
| 2011/0016123 | A1* | 1/2011 | Pandey | G06F 16/2308 707/737 |
| 2011/0258268 | A1* | 10/2011 | Banks | G06Q 10/06 709/206 |
| 2011/0307895 | A1* | 12/2011 | Liao | G06F 9/5027 718/102 |
| 2013/0054714 | A1 | 2/2013 | Bedi | |
| 2013/0198296 | A1* | 8/2013 | Roy | G06Q 10/107 709/206 |
| 2015/0161199 | A1 | 6/2015 | Pinko | |
| 2016/0036896 | A1* | 2/2016 | Spivey | H04L 67/26 709/204 |
| 2016/0219089 | A1* | 7/2016 | Murthy | H04L 65/4076 |
| 2017/0180289 | A1* | 6/2017 | Chiappone | H04L 67/2809 |
| 2017/0220612 | A1* | 8/2017 | Crossley | H04L 65/4084 |
| 2017/0228253 | A1* | 8/2017 | Layman | G06F 11/328 |
| 2017/0242887 | A1* | 8/2017 | Zhao | G06F 9/5083 |
| 2017/0317935 | A1* | 11/2017 | Murthy | G06Q 20/32 |
| 2018/0039621 | A1* | 2/2018 | Sronce | G06F 3/04817 |
| 2018/0159731 | A1* | 6/2018 | Murthy | G06F 16/24558 |
| 2018/0183852 | A1 | 6/2018 | Jackson et al. | |
| 2018/0248825 | A1 | 8/2018 | Sedan | |
| 2018/0302358 | A1 | 10/2018 | Nambiar et al. | |
| 2018/0307546 | A1* | 10/2018 | Aston | G06F 9/44 |
| 2018/0330303 | A1 | 11/2018 | Mosley et al. | |
| 2019/0075176 | A1* | 3/2019 | Nguyen | H04W 4/18 |
| 2019/0327297 | A1* | 10/2019 | Madani | G06F 9/542 |
| 2020/0169560 | A1* | 5/2020 | Arora | H04L 9/0891 |
| 2020/0311226 | A1* | 10/2020 | Othman | H04L 63/20 |
| 2020/0402170 | A1* | 12/2020 | Konduru | H04L 67/10 |

OTHER PUBLICATIONS

Bulletin of the Technical Committee on Data Engineering Jun. 2012 vol. 35 No. 2 IEEE Computer Society (Year: 2012).*
O. Dolejs, P. Smolik and Z. Hanzalek, "On the Ethernet use for real-time publish-subscribe based applications," IEEE International Workshop on Factory Communication Systems, 2004. Proceedings., 2004, pp. 39-44, doi: 10.1109/WFCS.2004.1377674. (Year: 2004).*
Beyang, "GraphQL at Twitter", Sourcegraph, retrieved on Oct. 30, 2019 from https://about.sourcegraph.com/graphql/graphql-at-twitter, Oct. 27, 2017, 14 pages.
Viswanathan, "Dynamic Configuration at Twitter", Nov. 20, 2018, 11 pages.
Invitation to Pay Additional Fees and Partial Search Report for PCT Application No. PCT/US2020/070315, dated Nov. 24, 2020, 12 pages.

* cited by examiner

FIG. 7

EVENT PRODUCER SYSTEM OF A MESSAGING PLATFORM FOR DELIVERING REAL-TIME MESSAGES

CROSS-REFERENCE TO RELATED APPLICATION

This application claims priority to U.S. Provisional Application No. 62/883,633, filed on Aug. 6, 2019, entitled "Query Subscription in a Messaging Platform for Delivering Real-Time Messages", the contents of which are hereby incorporated by reference in its entirety.

BACKGROUND

A social media messaging platform may facilitate the exchange of millions or hundreds of millions of social media messages among its users. The messages exchanged on the platform often can provide users of the platform the latest update or reporting on current events. In some examples, a user may submit a search on the platform and receive a stream of results such that the user can view messages over time that match one or more keywords. However, matching messages in a very large message stream over a period of time while rendering those messages to the user in real-time involve complex and technique technical challenges such as processing speed, computer resource allocation, and security issues.

SUMMARY

This disclosure relates to streaming real-time messages over time to client applications according to query subscriptions that match content from a large stream of messages exchanged on a messaging platform in a manner that increases the speed of message delivery, effectively controls the management of computer resources to handle the fluctuation of the number of active query subscriptions, and/or increases the security of matching the query subscriptions against messages generated from the perspective of the authors while delivering those messages in real-time from the perspective of the users that initiated the query subscriptions.

To establish an active query in which the client application begins to receive a stream of messages relating to the active query, the client application may generate and send a query subscription request (e.g., a GraphQL subscription query), over a network to a subscription executor (e.g., a GraphQL engine) of the messaging platform to cause the subscription executor to generate a query subscription and provide the query subscription to an event producer system of the messaging platform. Also, the client application may generate and send a subscribe request to a transport engine to create a delivery channel between the client application and the transport engine. The messages matched by the event producer system may be streamed to the client application via the delivery channel. In this manner, the management of query subscriptions is separated from the delivery of messages by using two separate modules, e.g., the subscription executor, the transport engine, which may increase the speed of delivery from query creation to the matching and then rendering of real-time messages to the client. Also, in some examples, since two subscriptions are generated (e.g., one at the subscription executor, and one at the transport engine), this may suggest that the client application would have to renew at both the subscription executor and the transport module. However, as discussed later in the disclosure, the client application may renew with the transport engine, and the structure of the messaging platform may cause the query subscription to be renewed at the transport engine and the subscription executor, thereby decreasing the amount of communication transmitted between the client application and the messaging platform to maintain the query subscription. Furthermore, the messaging platform may be capable of executing query subscriptions from thousands of client applications against a large message stream (e.g., over 50k messages per second) and delivering tens of thousands of messages per second to the client applications.

The user may not be required to refresh the user interface or submit another request view new messages on the user interface, but rather the messages are pushed to the user interface of the user in response to other users posting messages on the messaging platform that match the query subscription. For example, the user may enter a search term such as "dog" to generate an active query, and then receive a stream of messages that include the search term "dog" and continue to receive messages that include the search term "dog" as new messages are created and posted to the messaging platform until the active query expires. As opposed to a static query in which results are provided once around the time of submitting the static query (e.g., receiving a list of web results in response to a search request), the user may continue to view matched content after the submission of the active query (and until the active query expires).

The event producer system includes an event producer manager and a plurality of event producers configured to simultaneously execute query subscriptions to identifying matching content. The event producer manager receives a query subscription from the subscription executor and assigns the query subscription to one or more event producers such that the query subscription is stored at the assigned event producer. In some examples, the event producer manager may manage the configuration of the event producers, e.g., causing the storage and removal of query subscriptions, to control the computing resources at the event producer system. For example, the event producer manager may remove expired (or faulty) query subscriptions from the event producers and assign new query subscriptions as they are received at the event producer manager. The assigned event producer generates a response event in response to a message from a message queue matching the query subscription. The response event may identify the message having content that is matched with the query subscription.

The subscription executor receives the response events, generates the messages identified by the response events with data from the perspective of the user that initiated the query subscription, and provides the messages to the transport engine to be delivered via the delivery channel. For example, the messages in the message queue have been generated from the perspective of their authors. However, the messages delivered to the client applications may be required to have data from the perspective of the users that initiated the requests. The subscription executor may generate the messages (e.g., hydrate and apply visibility rules to the messages) after they have been matched by the event producer system but before delivery by the transport engine. In this manner, if an author of a matched message has restricted (e.g., blocked or muted) the user that initiated the query subscription, the subscription executor may discard that message, thereby increasing the security of the messaging platform. Furthermore, in some examples, since the response event may only include the data that the user had requested for the subscription, the amount of data published on an event bus may be decreased, causing no extra data sent to the client which may help save bandwidth to stream more events per second.

In some examples, the event producers may be grouped into a plurality of event producer groups, where each event producer group receives the full message stream. Each producer group includes a plurality of event producers, where each event producer receives a separate portion of the full message stream. Each event producer group is allocated a separate portion of the query subscriptions. The event producer manager may assign a subscription query to an event producer group, where each event producer in the group stores and executes the query subscription. In some examples, the event producer manager may assign a subscription to a first event producer group and a second event producer group such that the query subscription can be maintained if there is an error at processing the query subscription at one of the event producer groups. In this manner, the system can easily control the amount of responses at the event producer system by increasing or decreasing the number of event producer groups and/or increasing or decreasing the number of event producers in each group to account for the fluctuating amount of query subscriptions and response events. For instance, in response to the number of event producers in a single event producer group being increased, each individual event producer may receive fewer messages from the message stream to process and consequently may have more computational capacity to handle extra searches. In response to the number of event producer groups being increased, the number of search terms allocated to the event producer may be reduced.

In some examples, the event producer system includes a collector service that receives the response events from the event producers and discards one or more response events to control a streaming rate such that the messages identified by the response events are streamed to the client application in a manner that is equal to or below a streaming rate threshold. For example, if the messages are streamed at a fast rate, the user may not be able to consume the streamed messages. As such, the collector service may throttle the streaming rate so that the rate at which the messages are streamed is equal to or less than a threshold level. For example, if the streaming rate threshold is 10 messages per second, the collector service may discard response events over 10 within a one second time interval. In some examples, the collector service may discard messages based on other attributes besides the time of when the response events are generated. For example, the collector service may discard messages predicated as low quality or abusive to provide the messages at a streaming rate that is less than the threshold. In some example, the collector service may discard messages that are predicted to have low engagements to provide the messages at a streaming rate that is less than the threshold. These and other features are further discussed in the detailed disclosure.

In some examples, the collector service receives status responses from the event producers and stores the status responses in a memory cache. The collector service may determine a health of the query subscription by periodically querying the memory cache for the status responses. If the collector service determines that the query subscription is repairable, the collector service may provide subscription data to one or more event producers reporting as faulty such that the query subscription can be repaired.

According to an aspect, a system for processing query subscriptions in a messaging platform includes a queue including a stream of messages exchanged on the messaging platform executable by a server computer, where the messaging platform is configured to stream messages to a user interface of a client application executable by a computing device. The system includes a plurality of event producers, and an event producer manager configured to receive a query subscription and assign the query subscription to one or more of the plurality of event producers, where each event producer is configured to generate a response event in response to a message from the steam of messages satisfying the query subscription. The system includes a collector service configured to receive status responses from the plurality of event producers and store the status responses in a memory cache, where the collector service is configured to periodically determine a health status of the query subscription by querying the status responses in the memory cache. In response to the health status being determined as repairable, the collector service is configured to obtain subscription data relating to the subscription query from the memory cache and provide the subscription data to one or more event producers to restart the query subscription.

According to some aspects, the system may include one or more of the following features (or any combination thereof). The event producer manager includes an application programming interface (API) configured to receive the query subscription via a thrift call. The event producer manager is configured to monitor a number of query subscriptions processed at the plurality of event producers and a size of the message stream, and to adjust a number of the plurality of event producers based on the number of query subscriptions and the size of the message stream. The plurality of event producers are arranged in event producer groups, and the event producer manager is configured to assign the query subscription to a first event producer group and a second event producer group. The plurality of event producers are arranged in event producer groups, and the event producer manager is configured to assign the query subscription to at least one event producer group based on a user identifier associated with the query subscription. The collector service is configured to receive response events from the event producers, store the response events in the memory cache, and publish the response events on a response event bus.

In response to receipt of new response event, the collector service is configured to determine whether the response events for the query subscription has exceeded a streaming rate threshold by querying the memory cache, where the collector service is configured to discard the new response event in response to the streaming rate threshold being exceeded. In response to receipt of a new response event, the collector service is configured to determine whether the message identifier of the new response event is stored in the memory cache, where the collector service is configured to publish the new response event on the response event bus and store the new response event in the memory cache in response to the message identifier not being stored in the memory cache. The collector service is configured to discard the new response event in response to the message identifier being stored in the memory cache. The plurality of event producers are arranged in event producer groups, and each event producer group includes a number of event producers such that the message stream is allocated between the event producers of a respective group.

The system includes a subscription executor configured to transmit the query subscription to the event producer manager in response to receipt of a query subscription request received over a network from the client application, and a transport engine configured to create a delivery channel between the transport engine and the client application in response to receipt of a subscribe request received over the network from the client application such that messages identified by the response events are streamed, via the delivery channel, to the client application during a period of time in which the query subscription is active. The event producer manager is configured to delete the query subscription at each of the plurality of event producers for the assigned group in response to expiration of the query subscription.

According to an aspect, a non-transitory computer-readable medium stores executable instructions that when executed by at least one processor are configured to cause the at least one processor to receive a query subscription to match content in a queue that includes a stream of messages exchanged on a messaging platform executable by a server computer, assign the query subscription to one or more of a plurality of event producers, generate, by an individual event producer, a response event in response to a message from the respective portion of the stream of messages including a query term of the query subscription, receive, by a collector service, status responses from the event producers and store the status responses in a memory cache, periodically determine, by the collector service, a health status of the query subscription by querying the status responses in the memory cache, and, in response to the health status being determined as repairable, obtain subscription data relating to the subscription query from the memory cache, and provide the subscription data to one or more event producers to restart the query subscription.

According to some aspects, the non-transitory computer readable medium may store instructions configured to provide or cause one or more of the above/below features (or any combination thereof). The plurality of event producers are arranged in event producer groups, and the query subscription is assigned to an event producer group. The query subscription is assigned to the event producer group based on execution of a modulo operation using a user identifier associated with the query subscription. The operations may further include publish the response event on a response event bus and store the response event in the memory cache. The operations may further include determine whether a number of response events within a period of time has exceeded a streaming rate threshold and discard the response event in response to the streaming rate threshold being exceeded. The operations may further include determine whether the message identified by the response event has already been published to a response event bus and discard the response event in response to the message being determined as already been published to the response event bus. The operations may further include initiate transmission of a status message indicating the health status of the query subscription. The operations may further include transmit, by a subscription executor, the query subscription to an event producer manager in response to receipt of a query subscription request received over a network from the client application, create, by a transport engine, a delivery channel between the transport engine and the client application in response to receipt of a subscribe request received over the network from the client application, generate, by the subscription executor, based on a message identifier from the response event and a user identifier associated with the query subscription, and stream, by the transport engine, the message to the client application via the delivery channel during a period of time in which the query subscription is active.

According to an aspect, a method for processing query subscriptions in a messaging platform may include receiving, by an event producer manager, a query subscription to match content in a queue that includes a stream of messages exchanged on a messaging platform executable by a server computer, assigning, by the event producer manager, the query subscription to an event producer group of a plurality of event producer groups, each event producer group including a plurality of event producers, generating, by an individual event producer, a response event in response to a message from the respective portion of the stream of messages including a query term of the query subscription, publishing, by a collector service, the response event to a response event bus, receiving, by the collector service, status responses from the event producers and store the status responses in a memory cache, periodically determining, by the collector service, a health status of the query subscription by querying the status responses in the memory cache, and, in response to the health status being determined as repairable, obtaining subscription data relating to the subscription query from the memory cache, and providing the subscription data to one or more event producers to restart the query subscription.

According to some aspects, the method may include one or more of the above/below features (or any combination thereof). The query subscription is assigned to a primary event producer group and a secondary event producer group. The query subscription is assigned to the event producer group based on a user identifier associated with the query subscription. The method may include determining, by the collector service, whether a number of response events within a period of time has exceeded a streaming rate threshold before the publishing step, and discarding, by the collector service, the response event in response to the streaming rate threshold being exceeded. The method may include determining, by the collector service, whether the message identified by the response event has already been published to the response event bus before the publishing step, and discarding, by the collector service, the response event in response to the message being determined as already been published to the response event bus.

According to an aspect, a system for processing query subscriptions in a messaging platform includes a message queue including a stream of messages exchanged on the messaging platform executable by a server computer, an event producer configured to receive a query subscription and generate response events while the query subscription is active such that a response event is generated in response to a message of the stream of messages including a query term of the query subscription, a collector service configured to receive the response events and discard one or more of the response events to control a streaming rate at which messages identified by the response events are delivered to the client application, and a transport engine configured to deliver, over a network, the messages to the client application according to the streaming rate.

According to some aspects, the system may include one or more of the above/below features (or any combination thereof). The collector service is configured to discard a new response event in response to a number of previously-received response events exceeding a threshold amount over a period of time. The collector service is configured to publish a new response event to a response event bus in response to a number of previously published response events being equal to or less than a threshold amount over a period of time. The collector service is configured to publish the response events to a response event bus and store the published response events in a memory cache, where, in response to a new response event, the collector service is configured to query the memory cache to determine the number of response events stored in the memory cache over a period of time and discard the new response event in response to the number of response events stored in the memory cache exceeding a threshold amount during the period of time. Each response event includes a message identifier and subscription data that includes information about the query subscription. The system may include a subscription executor configured to receive the response events from the collector service via a response event bus, where the subscription executor is configured to generate a message for each response event based on a message identifier included in a respective response event and a user identifier associated with the query subscription. The collector service is configured to receive first response events for a first query subscription from the event producer and receive second response events for a second query subscription from the event producer, where the collector service configured to discard one or more of the first response events such that messages identified by the first response events are streamed by the transport engine via a first delivery channel in a manner that is equal to or less than a streaming rate threshold, and the collector service is configured to discard one or more of the second response events such that messages identified by the second response events are streamed by the transport engine via a second delivery channel in a manner that is equal to or less than the streaming rate threshold.

The collector service may include a plurality of collector service instances, where each collector service instance configured to receive a separate portion of the response events and obtain a subset of response events by discarding one or more response events such that each subset includes a number of response events that is equal to or less than an individual streaming rate threshold. The system may include a memory cache configured to store each subset of response events received from a respective collector service instance, where at least one of the plurality of collector service instance is configured to aggregate the subsets and discard one or more response events from the aggregated subsets such that the aggregated subsets includes a number of response events that is equal to or less than a streaming rate threshold. The collector service is configured to receive engagement probability metrics for messages identified by the response events, where the engagement probability metrics indicates predicted levels of engagement with the messages, and the collector service is configured to discard one or more response events based on the engagement probability metrics. The collector service is configured to receive message health metrics for messages identified by the response events, where the message health metrics indicates risk levels of violating one or more conditions of the messaging platform, and the collector service configured to discard one or more response events based on the message health metrics.

According to an aspect, a non-transitory computer-readable medium stores executable instructions that when executed by at least one processor are configured to cause the at least one processor to receive a stream of messages exchanged on a messaging platform executable by a server computer, where the messaging platform is configured to deliver messages to a user interface of a client application executable by a computing device, receive a query subscription for an active query on the messaging platform, generate response events while the query subscription is active such that a response event is generated in response to a message of the stream of messages including a query term of the query subscription, discard one or more of the response events to control a streaming rate at which messages identified by the response events are delivered to the client application, and deliver, over a network, the messages to the client application according to the streaming rate.

According to some aspects, the non-transitory computer-readable medium may include instructions that provide or cause one or more of the above/below features (or any combination thereof). A newly-received response event is discarded in response to a number of previously-received response events exceeding a threshold amount over a period of time. A newly-received response event is published to a response event bus in response to a number of previously published response events being equal to or less than a threshold amount over a period of time. The operations may further include publish the response events to a response event bus, store the published response events in a memory cache, and determine a number of response events stored in the memory cache over a period of time and discard a new response event in response to the number of response events stored in the memory cache exceeding a threshold amount during the period of time. The operations may include receive the response events via a response event bus, where each response event includes a message identifier, and generate messages based on the response events such that a message is generated for each response event based on a message identifier included in a respective response event and a user identifier associated with the query subscription.

According to an aspect, a method for processing query subscriptions in a messaging platform includes receiving a stream of messages exchanged on the messaging platform executable by a server computer, receiving a query subscription for an active query on the messaging platform, generating response events such that a response event is generated in response to a message of the stream of messages including a query term of the query subscription, discarding one or more of the response events to control a streaming rate at which messages identified by the response events are delivered to the client application, where each response event includes a messaging identifier, generating the messages based on the response event such that a message is generated based on the message identifier included within a respective response event and a user identifier associated with the subscription query, and delivering the messages, over a network, to the client application according to the streaming rate.

According to some aspects, the method may include one or more of the above/below features (or any combination thereof). A newly-received response event is discarded in response to a number of previously-received response events exceeding a threshold amount over a period of time. The method may include publishing the response events to a response event bus, storing the published response events in a memory cache, and determining a number of response events stored in the memory cache over a period of time and discard a new response event in response to the number of response events stored in the memory cache exceeding a threshold amount during the period of time. The method may include receiving engagement probability metrics for messages identified by the response events, where the engagement probability metrics indicates predicted levels of engagements with the messages and discarding one or more response events based on the engagement probability metrics. The method may include receiving message health metrics for messages identified by the response events, where the message health metrics indicates risk levels of violating one or more conditions of the messaging platform and discarding one or more response events based on the message health metrics.

According to an aspect, a method for processing query subscriptions in a messaging platform to deliver real-time messages to client applications includes transmitting, by a subscription executor, a query subscription to an event producer system in response to receipt of a query subscription request from a client application, creating, by a transport engine, a delivery channel between the client application and the transport engine in response to receipt of a subscribe request from the client application, generating, at the event producer system, a response event in response to a message from a stream of messages having content that satisfies the query subscription, determining, by the subscription executor, whether an author of the message identified by the response event has restricted a user associated with the user identifier, discarding, by the subscription executor, the message identified by the response event in response to the user being determined as restricted by the author, and streaming, by the transport engine, the message identified by the response event to the client application via the delivery channel during a period of time in which the query subscription is active in response to the user being determined as not restricted by the author.

According to some aspects, the method may include one or more of the above/below features (or any combination thereof). The query subscription request includes a query term and an expiration time. The event producer system includes a plurality of event producers, and the method includes assigning the query subscription to one or more of the plurality of event producers based on the user identifier. The subscribe request includes a transport topic and the user identifier. The method may include identifying, by the subscription executor, a transport topic in response to receipt of the query subscription request, generating, by the subscription executor, a subscription identifier in response to receipt of the query subscription request, and transmitting, over a network, by the subscription executor, a subscription status response to the client application, where the subscription status response includes the transport topic and the subscription identifier, and the subscribe request includes the transport topic and the subscription identifier. The method may include assigning, by an event producer manager, the query subscription to a plurality of event producers, storing the query subscription at each of the plurality of event producers, and generating, by each event producer, a response event in response to a message from the stream of messages having content that satisfies the query subscription.

According to an aspect, a messaging platform for processing query subscriptions to deliver real-time messages to client applications includes an event producer system configured to receive a stream of messages exchanged on the messaging platform and generate a response event in response to a message from the stream of messages having content that satisfies a query subscription, a subscription executor configured to determine whether an author of the message identified by the response event has restricted a user associated with the query subscription and discard the message identified by the response event in response to the user being determined as restricted by the author, and a transport engine configured to receive, over the network, a subscribe request from a client application to establish a delivery channel between the transport engine and the client application, where the transport engine is configured to stream the message identified by the response event to the client application via the delivery channel during a period of time in which the query subscription is active in response to the user being determined as not restricted by the author.

According to some aspects, the messaging platform may include one or more of the above/below features (or any combination thereof). The subscription executor is configured to transmit the query subscription to the event producer system in response to receipt of a query subscription request from the client application. The subscription executor is configured to identify a transport topic in response to receipt of a query subscription request from the client application, where the subscription executor is configured to transmit, over the network, a subscription status response to the client application, and the subscription status response includes the transport topic. The subscription executor is configured to generate a subscription identifier that uniquely identifies the query subscription and transmit the subscription identifier in the subscription status response. The subscribe request includes a transport topic and a user identifier.

The subscription executor is connected to a response event bus to obtain the response events as the response events are generated by the event producer system, each response event including a message identifier. The subscription executor us configured to generate the message based on the message identifier, where the subscription executor is configured to provide the message to the transport engine for delivery to the client application via the delivery channel. The subscription executor includes a GraphQL application programming interface (API) and a GraphQL executor. The GraphQL executor is configured to communicate with the GraphQL API to generate a JavaScript object notation (JSON) message for each response event. The GraphQL executor is configured to provide the JSON message to the transport engine for delivery to the client application via the delivery channel. The event producer system includes an event producer manager and a plurality of event producers, where the event producer manager is configured to receive the query subscription from the subscription executor and assign the query subscription to one or more event producers of the plurality of event producers.

According to an aspect, a non-transitory computer-readable medium stores executable instructions that when executed by at least one processor are configured to cause the at least one processor to transmit, by a subscription executor, a query subscription to an event producer system in response to receipt of a query subscription request from a client application, create, by a transport engine, a delivery channel between the client application and the transport engine in response to receipt of a subscribe request from the client application, generate, at the event producer system, a response event in response to a message from a stream of messages having content that satisfies the query subscription, determine, by the subscription executor, whether an author of the message identified by the response event has restricted a user associated with the user identifier, discard, by the subscription executor, the message identified by the response event in response to the user being determined as restricted by the author, and stream, by the transport engine, the message identified by the response event to the client application via the delivery channel during a period of time in which the query subscription is active in response to the user being determined as not restricted by the author.

According to some aspects, the non-transitory computer-readable medium may store instructions that provide one or more of the above/below features (or any combination thereof). The query subscription request includes a query term and an expiration time, where the subscribe request includes a transport topic, and the delivery channel is associated with the transport topic such that messages are streamed to the client application corresponding to the transport topic. The operations may include identify, by the subscription executor, a transport topic based on subscription data included in the query subscription request, generate, by the subscription executor, a subscription identifier based on the subscription data, and transmit, over a network, by the subscription executor, a subscription status response to the client application, where the subscription status response includes the transport topic and the subscription identifier. The subscribe request includes the transport topic and the subscription identifier. The operations may include assign the query subscription to one or more event producers of the event producer system, store the query subscription at each assigned event producer, and generate, by each event producer, a response event in response to a query term of the query subscription being matched against a message from the stream of messages.

According to an aspect, a method of processing query subscriptions for streaming real-time messages from a messaging platform includes transmitting, by a client application, a query subscription request, over a network, to a subscription executor of the messaging platform, where the query subscription request is configured to cause the subscription executor to generate a query subscription to be executed on a queue of messages exchanged on the messaging platform, transmitting, by the client application, a subscribe request, over the network, to a transport engine of the messaging platform, where the subscribe request is configured to cause the transport engine to create a delivery channel between the transport engine and the client application, receiving, by the client application, a stream of messages that satisfy a criteria of the query subscription via the delivery channel such that messages are streamed on a user interface of the client application while the query subscription is active, and periodically transmitting, by the client application, a subscribe renew request, over the network, to the transport engine, where the subscribe renew request is configured to cause the transport engine to renew the delivery channel and cause the subscription executor to renew the query subscription.

According to some aspects, the method may include one or more of the above/below features (or any combination thereof). The query subscription request includes a query term and a user identifier. The query subscription request includes an expiration time defining a period of time in which the query subscription is active. The subscribe request includes a transport topic, where the transport topic corresponds to one or more query terms associated with the query subscription. The method may include receiving, by the client application, a subscription status response, over the network, from the subscription executor, where the subscription status response includes a transport topic and a subscription identifier, and generating, by the client application, the subscribe request to include the transport topic and the subscription identifier. The query subscription request and the subscribe request are transmitted substantially in parallel with each other. The method may include receiving, by the client application, a channel identifier from the transport engine, the channel identifier identifying the delivery channel. The stream of messages is rendered on a timeline of the client application such that the messages are automatically streamed on the timeline over time. The timeline is a search column on the user interface of the client application, where the method further includes generating, by the client application, the query subscription request in response to the creation of the search column. The timeline is a home timeline of a user of the client application such that the messages are automatically streamed to the home timeline of the user. The stream of messages includes messages within a conversation graph relating to a conversation on the messaging platform.

According to an aspect, a non-transitory computer-readable medium stores executable instructions that when executed by at least one processor are configured to cause the at least one processor to transmit, by a client application executable by a computing device, a query subscription request, over a network, to a subscription executor of a messaging platform executable by a server computer, where the query subscription request is configured to cause the subscription executor to generate a query subscription to be executed on a queue of messages exchanged on the messaging platform, receive, by the client application, a status message response, over the network, from the subscription executor, where the status message response includes a transport topic, transmit, by the client application, a subscribe request, over the network, to a transport engine of the messaging platform, where the subscribe request includes the transport topic, and the subscribe request is configured to cause the transport engine to create a delivery channel between the transport engine and the client application, receive, by the client application, a stream of messages that satisfy criteria of the query subscription via the delivery channel such that messages are streamed on a user interface of the client application at a streaming rate equal to or below a streaming rate threshold while the query subscription is active, and periodically transmit, by the client application, a subscribe renew request, over the network, to the transport engine, where the subscribe renew request is configured to cause the transport engine to renew the delivery channel and cause the subscription executor to renew the query subscription.

According to some aspects, the non-transitory computer-readable medium may store instructions that provide one or more of the above/below features (or any combination thereof). The query subscription request includes a query term, a user identifier, and an expiration time defining a period of time in which the query subscription is active. The query subscription request is a GraphQL subscription query. The operations may include receive, by the client application, a status message, over the network, from the transport engine via the delivery channel, and re-transmit, by the client application, the query subscription request and the subscribe request based on the status message.

According to an aspect, a system for processing query subscriptions for streaming real-time messages from a messaging platform includes a messaging platform, executable by a server computer, configured to generate a queue of messages exchanged on the messaging platform, and a client application, executable by a computing device, configured to render a timeline of social content on a user interface of the client application. The client application configured to transmit a query subscription request, over a network, to a subscription executor of the messaging platform, where the query subscription request is configured to cause the subscription executor to generate a query subscription to be executed on the queue of messages, transmit a subscribe request, over the network, to a transport engine of the messaging platform, where the subscribe request is configured to cause the transport engine to create a delivery channel between the transport engine and the client application, receive a stream of messages that satisfy criteria of the query subscription via the delivery channel such that the messages are streamed on a user interface of the client application at a streaming rate equal to or below a streaming rate threshold while the query subscription is active, and periodically transmit a subscribe renew request, over the network, to the transport engine, where the subscribe renew request is configured to cause the transport engine to renew the delivery channel and cause the subscription executor to renew the query subscription.

According to some aspects, the system may include one or more of the above/below features (or any combination thereof). The query subscription request is a GraphQL subscription query including a query term and a user identifier. The subscribe request includes a transport topic, where the transport topic corresponds to a query term, and the transport topic has a format compatible with the transport engine. The query subscription request and the subscribe request are transmitted substantially in parallel with each other. The client application is configured to automatically render the stream of messages on the timeline while the query subscription is active. The stream of messages includes messages related to a conversation, and the client application is configured to push the messages related to the conversation on the user interface as the message are generated and shared by the messaging platform.

BRIEF DESCRIPTION OF DRAWINGS

FIG. 7 illustrates an example of a user interface of the client application providing multiple timelines for streaming content according to an aspect.

DETAILED DISCLOSURE

Figure 1:
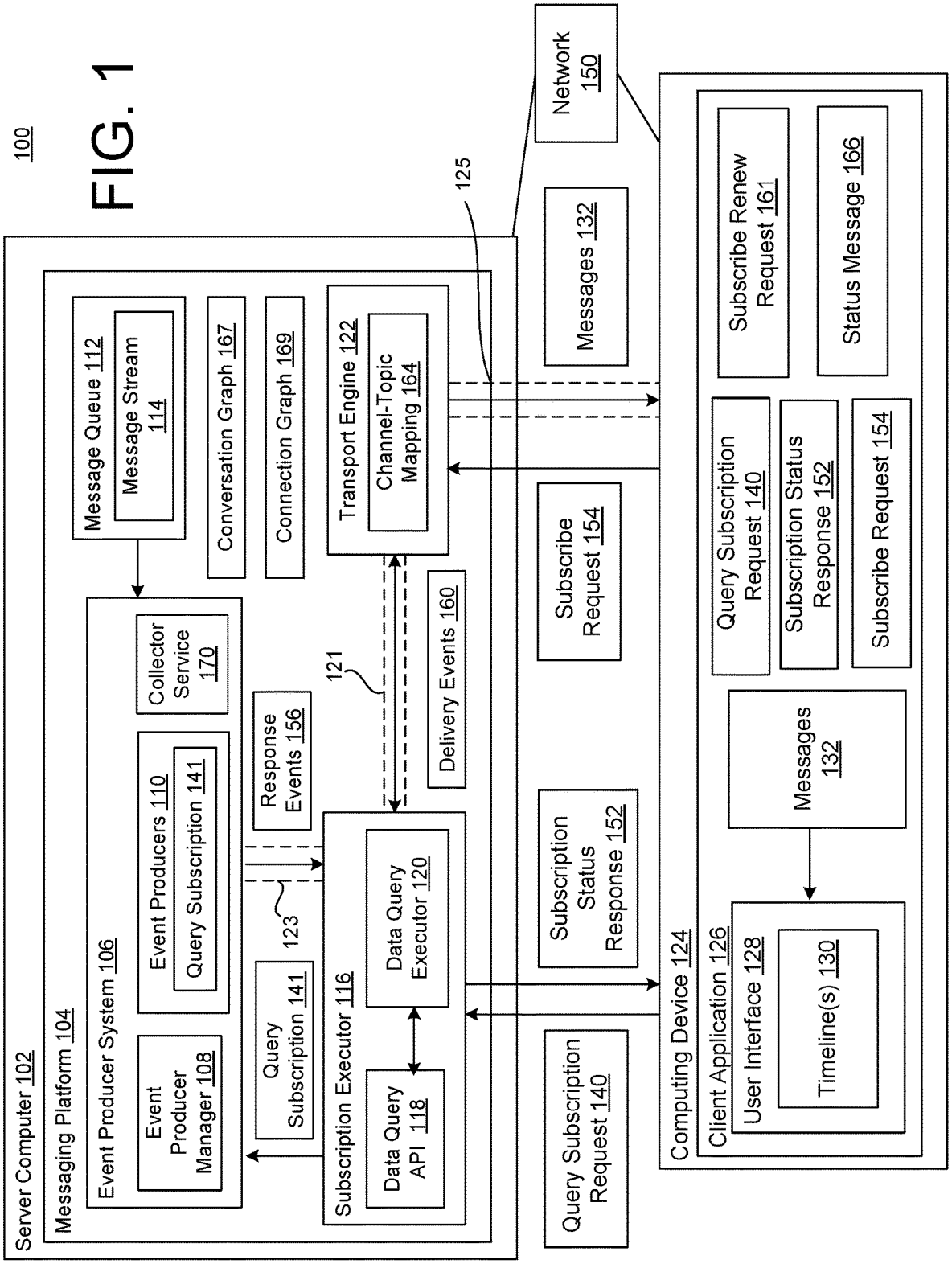
FIG. 1 is a schematic diagram of a system for streaming real-time messages over time to client applications according to query subscriptions that match content from a message stream having messages exchanged on a messaging platform according to an aspect.

FIG. 1 is a schematic diagram of a system 100 including a messaging platform 104 executable by one or more server computers 102, and a client application 126 executable by a computing device 124 according to an aspect. The messaging platform 104 is configured to stream real-time messages 132 over time to client applications 126 according to query subscriptions 141 that match content from a message stream 114 in a manner that increases the speed of message delivery, effectively controls the management of computer resources to handle the fluctuation of the number of active query subscriptions 141, and/or increases the security of matching the query subscriptions 141 and delivering those messages 132 in real-time from the perspective of the users that initiated the query subscriptions 141.

The messaging platform 104 is a platform for facilitating real-time communication between user devices (one of which is shown as computing device 124). The messaging platform 104 may store millions of accounts of individuals, businesses, and/or entities (e.g., pseudonym accounts, novelty accounts, etc.). One or more users of each account may use the messaging platform 104 to send messages to other accounts inside and/or outside of the messaging platform 104. The messaging platform 104 may be configured to enable users to communicate in "real-time", i.e., to converse with other users with minimal delay and to conduct a conversation with one or more other users during simultaneous sessions. In other words, the messaging platform 104 may allow a user to broadcast messages 132 and may display the messages 132 to one or more other users within a reasonable time frame to facilitate a live conversation between users. In some examples, recipients of a message 132 may have a predefined graph relationship in a connection graph 169 with an account of the user broadcasting the message 132.

The client application 126 is configured to communicate with the messaging platform 104 over a network 150. The client application 126 may be a social media messaging application in which users post and interact with messages 132. In some examples, the client application 126 is a native application executing on an operating system of the computing device 124 or may be a web-based application executing on the server computer 102 (or other server) in conjunction with a browser-based application of the computing device 124. The computing device 124 may access the messaging platform 104 via the network 150 using any type of network connections and/or application programming interfaces (APIs) in a manner that permits the client application 126 and the messaging platform 104 to communicate with each other.

The messages 132 may refer to message creation events such as the creation and posting of new messages to the messaging platform 104. In some examples, the messages 132 may refer to re-share events such as the re-sharing of previously posted messages on the messaging platform 104. In some examples, the messages 132 may refer to engagement events such as the favoritizing or liking of previously posted messages on the messaging platform 104.

The messaging platform 104 includes a subscription executor 116, an event producer system 106, and a transport engine 122. The subscription executor 116 receives, over the network 150, a query subscription request 140 from the client application 126 and send a query subscription 141 to the event producer system 106 to generate response events 156 such that a response event 156 is generated in response to a message from the message stream 114 satisfying criteria of the query subscription 141. The transport engine 122 receives, over the network 150, a subscribe request 154 from the client application 126 to establish a delivery channel 125 between the transport engine 122 and the client application 126 such that messages 132 satisfying the criteria of the query subscription 141 are stream via the delivery channel 125, to the client application 126 in response to the response events 156 being generated during a period of time in which the query subscription 141 is active.

In some examples, the messages 132 are streamed to one or more timelines 130. In some examples, the messages 132 are streamed in chronological order on the timeline 130. In some examples, the messages 132 are streamed in reverse-chronological order on the timeline 130. In some examples, the messages 132 are ranked on the timeline 130. In some examples, the messages 132 are not ranked on the timeline 130. In some examples, the timeline 130 is a column (e.g., a search column) on the user interface 128 that streams messages 132 in real-time that matches the search criteria. For example, the user may use the client application 126 to submit an active query to obtain messages 132 including the search term "dog," and the client application 126 streams the messages 132 on the timeline 130 that include the search term "dog" until the active query expires (e.g., the user performs an action to close the query or the active query times out).

In some examples, the timeline 130 is a home timeline of the user account in which the client application 126 streams messages 132 in real-time from user accounts linked to the user account in the connection graph 169 stored at the messaging platform 104. In some examples, timeline 130 is a direct message timeline in which the client application 126 streams messages 132 sent directly to the user. In some examples, the stream of messages 132 include messages within a conversation graph 167 relating to a conversation on the messaging platform 104. The conversation graph 167 may define a reply structure of messages 132 relating to a conversation. In some examples, the messages 132 relating to the conversation may be automatically pushed to the user interface 128 as users are replying to messages 132 in the conversation graph 167.

As discussed herein, the management of query subscriptions 141 is separated from the delivery of the messages 132 by using two separate modules, e.g., the subscription executor 116 and the transport engine 122. For example, the client application 126 transmits two requests to the messaging platform 104 to initiate receiving real-time messages 132, e.g., one directed to the subscription executor 116 for query subscription generation, and other one directed to the transport engine 122 to establish a delivery channel 125 to receive the messages 132. The subscription executor 116 receives the query subscription request 140 from the client application 126 to implement the query subscription 141 at the event producer system 106, and the transport engine 122 receives the subscribe request 154 from the client application 126 to establish the delivery channel 125 in which messages 132 identified by the event producer system 106 are streamed to the client application 126.

The subscription executor 116 may be a query language processor configured to receive a query request and generate a query response such as a JavaScript Object Notation (JSON) response. Generally, the subscription executor 116 receives, over the network 150, query subscription requests 140 from the client application 126, and generates and sends the query subscriptions 141 to the event producer system 106 in response to the query subscription requests 140. The subscription executor 116 subscribes to a response event bus 123 to receive the response events 156 from the event producer system 106, generates (e.g., hydrates and applies visibility rules to) the messages 132 based on the response events 156 (thereby obtaining messages 132 with the perspective of the user), and publishes the messages 132 on a delivery event bus 121 that are provided to the transport engine 122 for delivery to the client application 126.

In some examples, the subscription executor 116 includes a data query application programming interface (API) 118 and a data query executor 120. The data query API 118 is communicatively connected to the data query executor 120. In some examples, the data query API 118 is a GraphQL API. In some examples, the data query executor 120 is a GraphQL executor. GraphQL may specific three operation types such as query, mutation, and subscription. In some examples, the data query API 118 includes a library (e.g., a GraphQL library) configured to support the subscription operations. The data query API 118 communicates with the client application 126 over a network connection (e.g., a HTTP connection) to receive and transmit information related to the generation and management of the query subscriptions 141. In some examples, the data query API 118 includes an endpoint (e.g., a thrift endpoint) that is used by the data query executor 120 to execute queries against response events 156 received from the event producer system 106.

The data query executor 120 monitors and receives the response events 156 from the event producer system 106 via the response event bus 123, delivers the response events 156 to the data query API 118 via the endpoint, receives the full messages 132 from the data query API 118, and publishes delivery events 160 having the messages 132 to the delivery event bus 121 to be provided to the transport engine 122 for delivery to the client application 126. In some examples, the response event bus 123 and the delivery event bus 121 are separate distributed queue systems in which subscribers subscribe to the buses to receive events (e.g., the transport engine 122 subscribes to the delivery event bus 121, and the data query executor 120 subscribes to the response event bus 123). Also, as further described later in the disclosure, the data query executor 120 may manage subscription renews.

The transport engine 122 is the delivery mechanism for streaming the messages 132 to the client application 126. The transport engine 122 is communicatively connected to the client application 126 over the network 150. The transport engine 122 communicates with the client application 126 over a network connection (e.g., a HTTP connection) to receive and transmit information related to the generation of a delivery channel 125 established between the transport engine 122 and the client application 126. As the transport engine 122 receives a delivery event 160, the transport engine 122 streams the message 132 included in the delivery event 160 over the delivery channel 125. Further, the transport engine 122 receive subscription renewal requests from the client application 126 to renew the query subscriptions 141, which are provided to the subscription executor 116 and then to the event producer system 106 to renew the query subscriptions 141.

The event producer system 106 is configured to support streaming search-query-results by matching queries against messages of the message stream 114 of the message queue 112. The event producer system 106 may include an event producer manager 108, one or more event producers 110, and a collector service 170. In some examples, the event producer manager 108 is an API. The event producer manager 108 is configured to communicate with the data query API 118 of the subscription executor 116 to receive new query subscriptions 141. The event producer manager 108 may receive a query subscription 141 and assign the query subscription 141 to one or more of the event producers 110. For example, the event producer manager 108 may receive a query subscription 141 and assign the query subscription 141 to an event producer 110 (or a group of event producers 110) such that the query subscription 141 is stored at the event producer 110 (or at each event producer 110 in the group).

The event producer(s) 110 receives the message stream 114 from the message queue 112 and identifies messages 132 that meet the search criteria of the query subscription 141. In some examples, the message stream 114 is a large stream of all the message 132 generated on the messaging platform 104. In some examples, the message stream 114 includes messages delivered at a rate over 10k messages per second. In some examples, the message stream 114 includes messages delivered at a rate over 25k messages per second. In some examples, the message stream 114 includes messages delivered at a rate over 50k messages per second. In some examples, the message stream 114 includes message creation events for messages created and posted on the messaging platform 104, message re-share events for existing messages that are re-shared on the messaging platform 104, and/or engagement events for existing messages that are favoritized or liked on the messaging platform 104.

Figure 2:
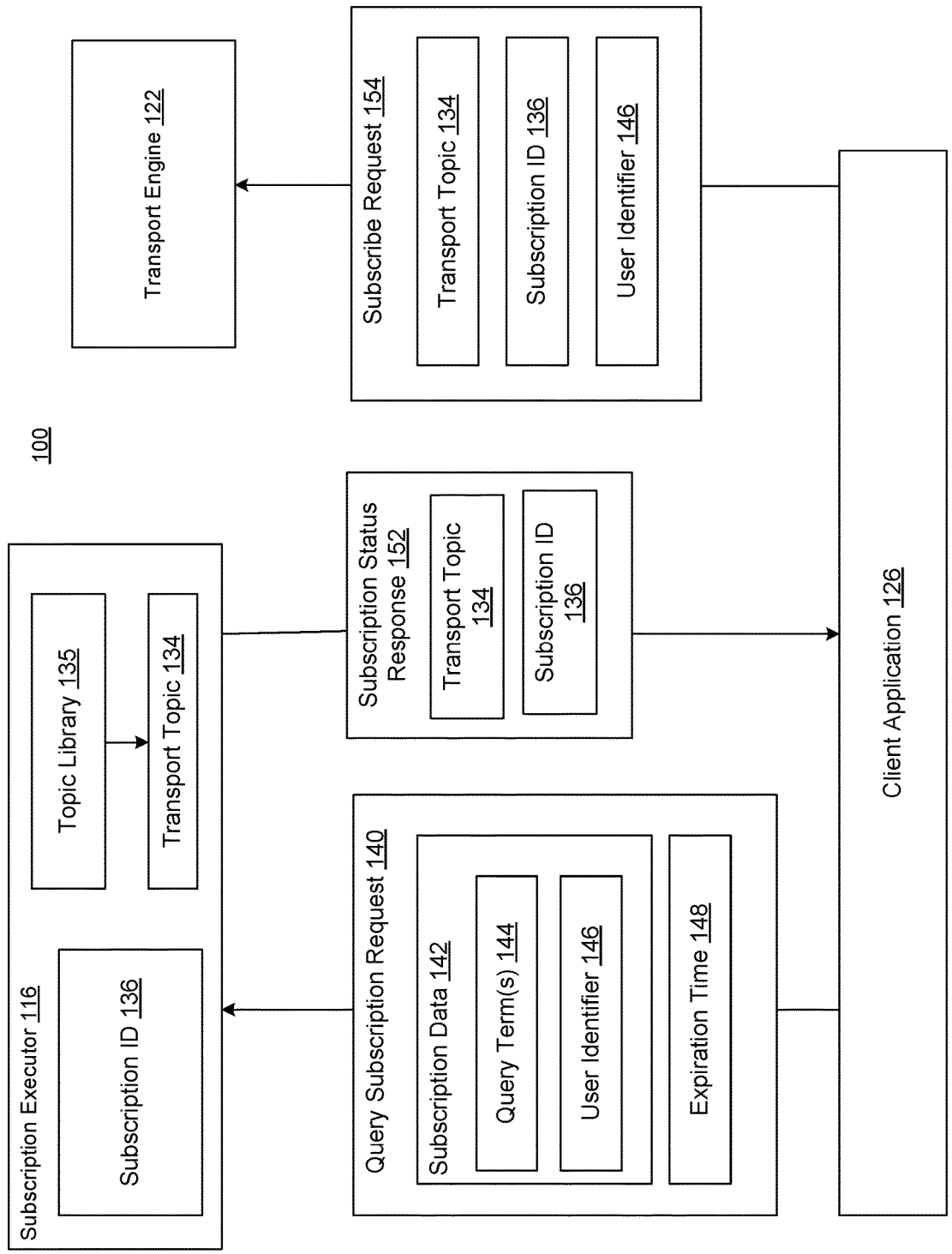
FIG. 2 illustrates a portion of the system depicting a transport engine, a subscription executor, and a client application for the generation of query subscriptions according to an aspect.

FIG. 2 illustrates the system 100 depicting the operations of query subscription generation in further detail according to an aspect. Referring to FIGS. 1 and 2, the client application 126 may generate a query subscription request 140 and transmit, over the network, the query subscription request 140 to the data query API 118 of the subscription executor 116. In some examples, a user may the user interface 128 of the client application 126 to submit an active query, and, in response to the submission of the active query, the client application 126 may generate and send the query subscription request 140. In some examples, the query subscription request 140 is configured to initiate a new query subscription 141 and initiate the implementation of the query subscription 141 at the event producer system 106. In some examples, the query subscription request 140 is a GraphQL subscription query over hypertext transfer protocol (HTTP).

The query subscription request 140 may include subscription data 142. The subscription data 142 includes one or more query terms 144 and a user identifier 146 of a user. In some examples, the query terms 144 include search terms provided by the user. In some examples, the subscription data 142 includes variables and one or more operation names. In some examples, the subscription data 142 includes a client application identifier, and an authenticated user identifier. In some examples, the query subscription request 140 includes an expiration time 148 that indicates a time value in which the query subscription 141 is active. If the amount of time exceeds the expiration time 148, the query subscription 141 may be considered timed-out (unless a renew request is received). In some examples, the client application 126 determines a value for the expiration time 148, which may be dependent upon the amount of time and/or the number of renewed subscriptions that have been sent by the client application 126.

In response to receipt of the query subscription request 140, the subscription executor 116 identifies a transport topic 134 based on the query term(s) 144 of the subscription data 142. The transport topic 134 may be a descriptive and/or numerical identifier that is detectable by the transport engine 122. In some examples, the subscription executor 116 identifies the transport topic 134 using a topic library 135 that defines a plurality of transport topics. For example, the subscription executor 116 may identify one of the plurality of transport topics in the topic library 135 that corresponds to the query term(s) 144. In some examples, if the subscription executor 116 cannot identify a transport topic 134 from the topic library 135 using the query term(s) 144, the subscription executor 116 may generate and send a response indicating that the query subscription 141 has failed. In some examples, the data query API 118 identifies the transport topic 134 using the subscription data 142. In some examples, the data query executor 120 identifies the transport topic 134 using the subscription data 142.

In response to receipt of the query subscription request 140, the subscription executor 116 may generate a subscription identifier 136 based on the subscription data 142. The subscription identifier 136 may be an identifier that identifies the query subscription 141. In some examples, the data query API 118 generates the subscription identifier 136. In some examples, the data query executor 120 generates the subscription identifier 136. In some examples, the subscription executor 116 may generate the subscription identifier 136 based on the user identifier 146, the query term(s) 144 and/or other information included in the subscription data 142 such as variables, operation name(s)), the authenticated user identifier, and/or the client application identifier. In some examples, the subscription executor 116 is configured to serialize and hash the subscription data 142 to generate the subscription identifier 136.

The data query API 118 is configured to transmit, over the network 150, a subscription status response 152 to the client application 126. The subscription status response 152 includes the transport topic 134. In some examples, the subscription status response 152 includes the subscription identifier 136. In some examples, the subscription status response 152 includes a status message indicating whether the query subscription request 140 is successful.

Upon receipt of the subscription status response 152, the client application 126 may generate and transmit a subscribe request 154, over the network 150, to the transport engine 122. The subscribe request 154 includes the transport topic 134. In some examples, the client application 126 uses the transport topic 134 identified in the subscription status response 152 for the subscribe request 154. In some examples, the client application 126 identifies the transport topic 134 using the subscription data 142 in the same manner as the subscription executor 116. In some examples, the subscribe request 154 includes the subscription identifier 136. In some examples, the subscribe request 154 includes the user identifier 146. In some examples, the client application 126 transmits the subscribe request 154 in response to receipt of the subscription status response 152. In some examples, the client application 126 transmits the subscribe request 154 substantially in parallel with the transmission of the query subscription request 140. In some examples, the client application 126 sends the query subscription request 140 and then sends the subscribe request 154 within a period of less than 500 ms from the transmission of the query subscription request 140. In some examples, the client application 126 sends the query subscription request 140 and then sends the subscribe request 154 within a period of 100-200 ms after sending the query subscription request 140.

In response to the subscribe request 154, the transport engine 122 establishes a delivery channel 125 with the client application 126 to stream the messages 132 to the client application 126. The delivery channel 125 is associated with the transport topic 134 such that messages 132 delivered over the delivery channel 125 correspond to the transport topic 134. In some examples, the transport engine 122 subscribes the client application 126 to the transport topic 134 corresponding to the user identifier 146 and the query term 144 (and/or a contributor identifier). The delivery channel 125 remains open and active while the query subscription 141 is active. In some examples, the transport engine 122 assigns a channel identifier to the delivery channel 125. In some examples, the transport engine 122 sends, over the network 150, the channel identifier to the client application 126. The client application 126 may periodically re-subscribe (e.g., every two-minutes) to the delivery channel 125. The client application 126 may automatically send a re-subscribe request in response to the query being active (e.g., a visible search column is displayed on the user interface 128). If the query ends (e.g., a column is scrolled off the user interface 128), the client application 126 may send a message to the transport engine 122 to unsubscribe from the transport topic 134, thereby closing the delivery channel 125.

Figure 3:
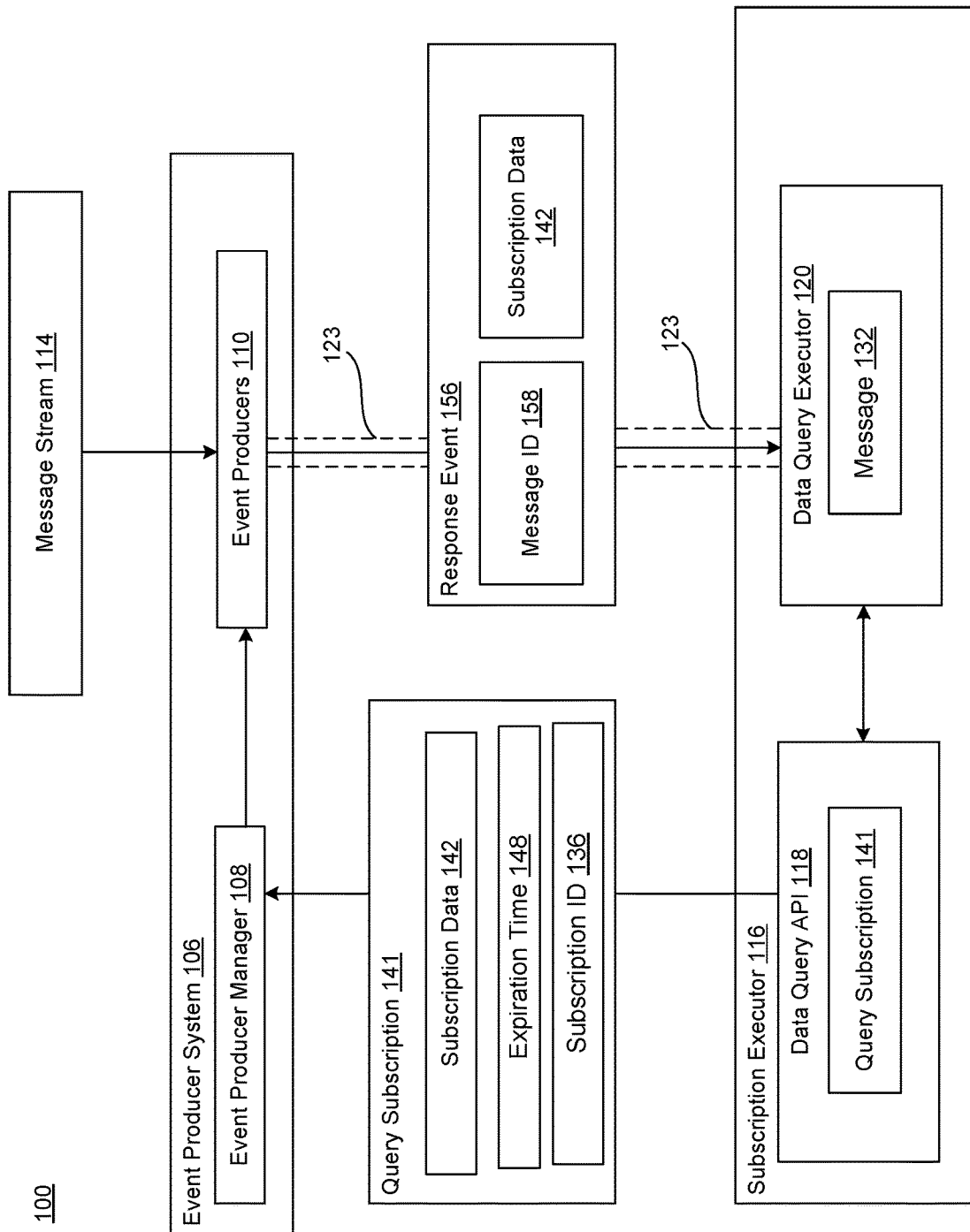
FIG. 3 illustrates a portion of the system depicting an event producer system and the subscription executor for implementing the query subscription and generating response events according to an aspect.
Figure 4:
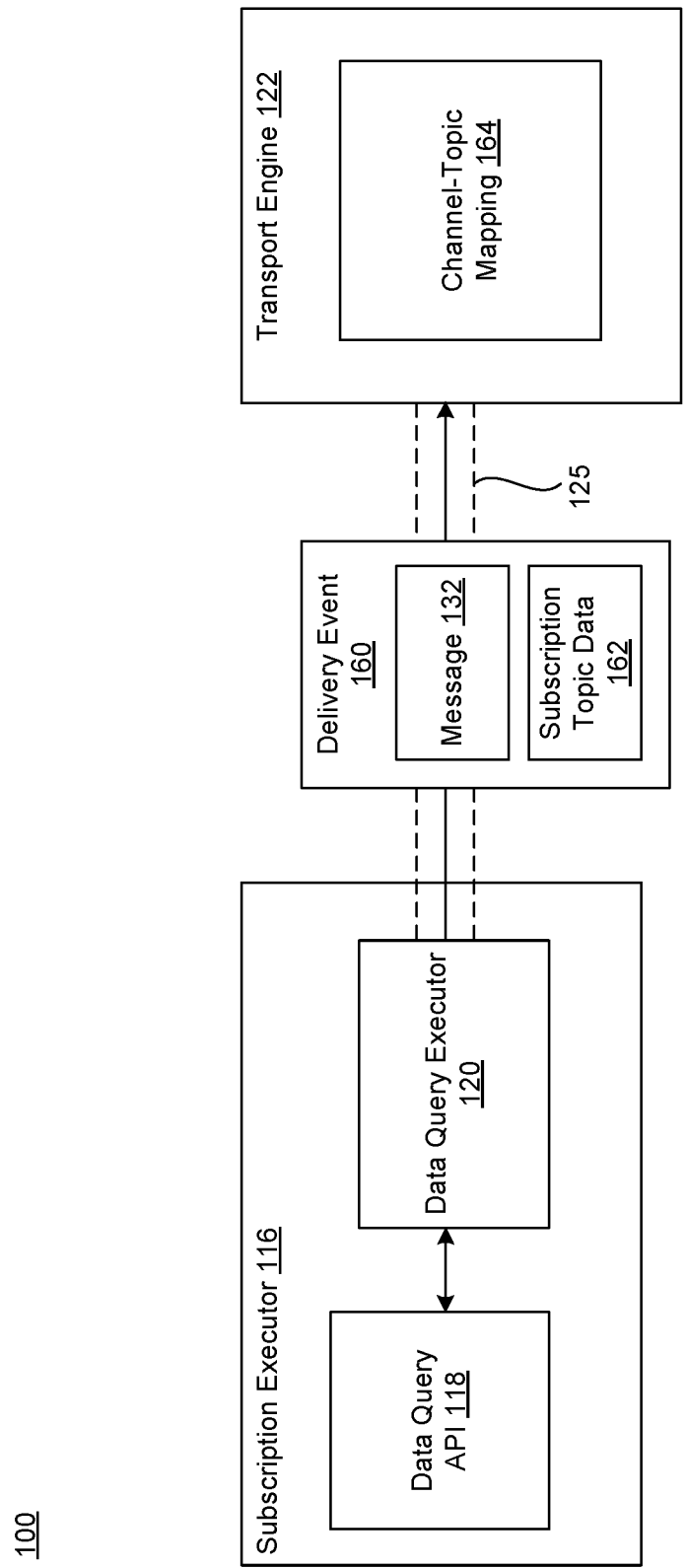
FIG. 4 illustrates a portion of the system depicting the subscription executor and the transport engine for delivering delivery events to the transport engine according to an aspect.

FIG. 3 illustrates the system 100 depicting example operations of the event producer system 106 and the subscription executor 116 to configure the query subscription 141 at the event producer system 106 and receive response events 156 from the event producer system 106 according to an aspect. FIG. 4 illustrates the system 100 depicting example operations of the subscription executor 116 and the transport engine 122 to deliver delivery events 160 to the transport engine 122.

In response to receipt of the query subscription request 140, the data query API 118 generates and sends the query subscription 141 to the event producer manager 108. The data query API 118 may send the query subscription 141 as a thrift request to the event producer manager 108. A thrift request may be a remote procedure call system that is used to communicate between various components of the messaging platform 104. The query subscription 141 includes the subscription data 142 (e.g., which may include the query term(s) 144), and the user identifier 146). In some examples, the query subscription 141 includes the subscription identifier 136. In some examples, the query subscription 141 includes the expiration time 148. In some examples, the query subscription 141 sent to the event producer manager 108 may include the user identifier 146 and other subscription related data to enable the event producer system 106 to return them in the response events 156 to provide enough context to hydrate and route the messages 132 identified by the response events 156. The event producer manager 108 may use the expiration time 148 to determine whether the query subscription 141 has timed-out. For example, if the time has exceeded the expiration time 148, the event producer manager 108 may instruct the event producer 110 to delete the query subscription 141, thereby saving resources for other query subscriptions 141.

The event producer manager 108 assigns the query subscription 141 to an event producer 110 (or a group of event producers 110). In some examples, the event producer manager 108 assigns the query subscription 141 based on the user identifier 146. The query subscription 141 is stored at the event producer 110 (or each event producer 110 in the group). The event producer 110 generates the response events 156 such that a response event 156 is generated in response to a message from the message stream 114 being determined as containing a query term 144 of the query subscription 141. The event producer 110 may publish the response events 156 to the response event bus 123.

In some examples, the collector service 170 receives the response events 156 and publishes the response events 156 to the response event bus 132. In some examples, as discussed in greater detail later in the disclosure, the collector service 170 may de-duplicate response events 156 relating to the same message 132, discard one or more response events 156 so that the streaming rate is below a threshold level, and/or periodically generate status messages about the health of the query subscriptions 141 at the event producer system 106. Each response event 156 includes a message identifier 158 that uniquely identifies the message 132 matching the query subscription 141. In some examples, each response event 156 includes the subscription data 142 (e.g., query term(s) 144), and the user identifier 146). In some examples, each response event 156 includes the subscription identifier 136. In some examples, each response event 156 includes only the message identifier 158.

The subscription executor 116 subscribes to the response event bus 123 to obtain the response events 156 published by the event producer system 106. Generally, the subscription executor 116 generates (e.g., hydrates) the messages 132 identified by the message identifiers 158 and applies visibility rules before providing the full messages 132 to the transport engine 122. In some examples, hydration may refer to the creation of the message 132 from the message identifier 158 and the user identifier 146 such that the generated message 132 has the format compatible with the client application 126 and includes data corresponding to the perspective of the user identified by the user identifier 146. In some examples, the subscription executor 116 is configured to generate a java script object notation (JSON) message (e.g., the full JSON message) based on the message identifier 158 and the user identifier 146. As the subscription executor 116 generates each message 132 corresponding to a respective response event 156, the subscription executor 116 published a delivery event 160 that includes the message 132 to the delivery event bus 121.

During message hydration, the subscription executor 116 may discard a response event 156 if the subscription executor 116 determines that the message 132 identified by the message identifier 158 violates a visibility rule, thereby improving the security of the messaging platform 104 while being able to deliver real-time messages 132 to the client application 126. For example, if the response event 156 identifies a message 132 authored by a user that restricted (e.g., blocked or muted) the user identified by the user identifier 146, the subscription executor 116 may discard the response event 156.

The data query executor 120 subscribes to the response event bus 123. The data query executor 120 may monitor the response event bus 123 to obtain any response events 156 published to the response event bus 123 by the event producers 110. The data query executor 120 may communicate with the data query API 118 to generate the message 132 in response to each response event 156 obtained from the response event bus 123. In some examples, the data query API 118 may receive both a query and an event and uses the event as the basis for the query execution.

For example, for a response event 156, the data query executor 120 may deliver the message identifier 158 and subscription metadata (e.g., the subscription data 142 and/or subscription identifier 136) to the data query API 118. In some examples, the data query executor 120 executes a thrift request to the data query API 118 to deliver the message identifier 158 and the subscription metadata. The data query API 118 extracts data from the message identifier 158 and the subscription metadata and executes the original query subscription 141 against the response event 156 to generate the message 132 (e.g., the full JSON message). The data query executor 120 receives the execution results (e.g., the message 132) from the data query API 118 and publish a delivery event 160 on the delivery event bus 121. As shown in FIG. 4, the delivery event 160 includes the message 132. In some examples, the delivery event 160 includes transport topic data 162 that identifies the transport topic 134.

The transport engine 122 subscribes to the delivery event bus 121 to monitor and obtain delivery events 160 published by the data query executor 120. For example, when a delivery event 160 is published to the delivery event bus 121, the transport engine 122 obtains the delivery event 160 and determines which delivery channel 125 to stream the message 132 included within the delivery event 160 based on a channel-topic mapping 164 that maps delivery channels 125 to transport topics 134. For example, the transport topic data 162 may identify the transport topic 134 associated with the message 132, and the transport engine 122 may identify the appropriate delivery channel 125 to stream the message 132 based on the channel-topic mapping 164. The transport engine 122 is configured to stream the message 132 to the client application 126 over the delivery channel 125.

Figure 5:
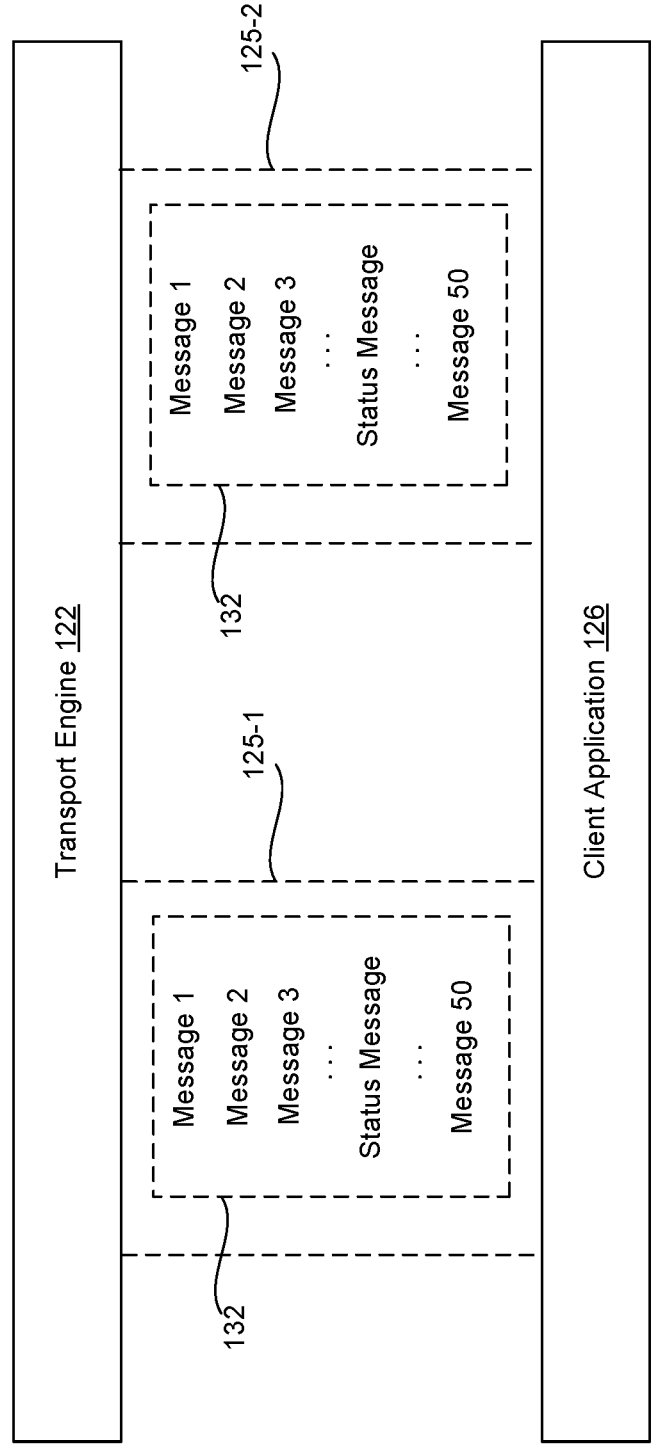
FIG. 5 illustrates a portion of the system depicting the transport engine and the client application for streaming messages according to an aspect.

FIG. 5 illustrates the system 100 depicting example operations of the transport engine 122 for multiple delivery channels 125. For example, if the client application 126 has established multiple query subscriptions 141, the transport engine 122 creates a separate delivery channel 125 for each active query subscription 141 and then delivers those messages 132 over its respective delivery channel 125. For example, in response to a query subscription 141 relating to the search term "dogs", the transport engine 122 transmits, over the network 150, the messages 132 received from the subscription executor 116 to the client application 126 via a first delivery channel 125-1 (e.g., the "dogs" delivery channel). In response to an active query subscription 141 relating to the search term "cats", the transport engine 122 transmits, over the network 150, the messages 132 received from the subscription executor 116 to the client application 126 via a second delivery channel 125-2 (e.g., the "cats" communication channel).

Although the client application 126 transmits two requests (e.g., the query subscription request 140 and the subscribe request 154) to generate and receive messages 132 to the messaging platform 104, in some examples, the client application 126 may renew with one of the subscription executor 116 or the transport engine 122. In some examples, the client application 126 renews with the transport engine 122. For example, the subscription to the transport topic 134 may expire after a time interval unless the subscription is renewed by the client application 126 (e.g. the client application 126 must renew with the transport engine 122 every period of time (e.g., every 2 minutes) or the query subscription 141 expires).

Figure 6:
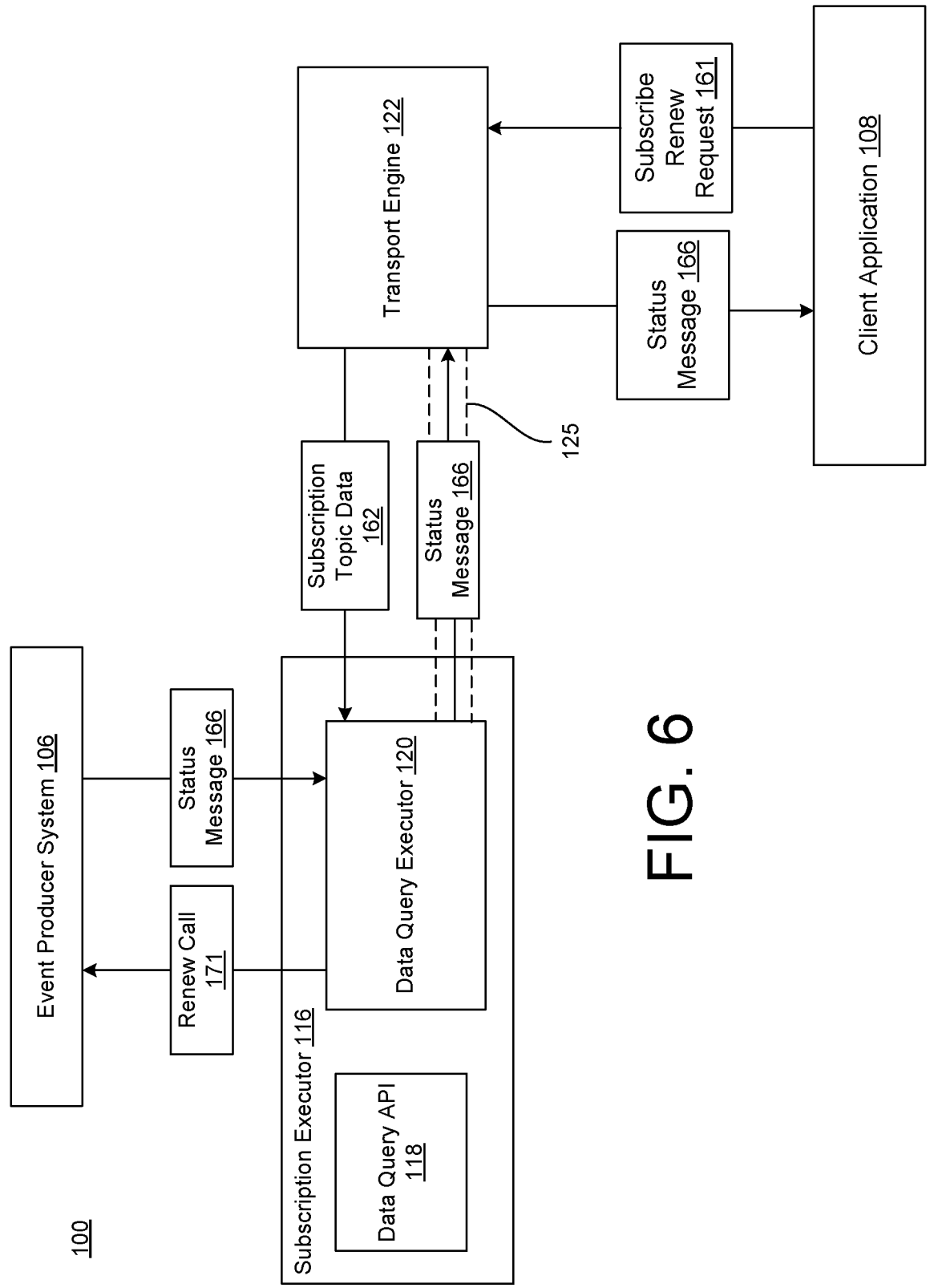
FIG. 6 illustrates a portion of the system depicting the event producer system, the subscription executor, the transport engine, and the client application for renewing the query subscription according to an aspect.

FIG. 6 illustrates the system 100 depicting example operations of a renew operation according to an aspect. In some examples, the subscription executor 116 (e.g., the data query executor 120) is configured manage subscription renews. For example, the client application 126 may transmit, over the network 150, a subscribe renew request 161 to the transport engine 122 to renew the subscription to the transport topic 134. In response to the subscribe renew request 161, the transport engine 122 may provide transport topic data 162 to the data query executor 120. The transport topic data 162 may include information about the transport topic 134, the subscription identifier 136, and/or information about which event producer 110 is assigned to generate response events 156 for the user identifier 146. In response to the transport topic data 162, the data query executor 120 may transmit a renew call 171 to the event producer system 106.

The event producer manager 108 may receive the renew call 171 and update the expiration time 148 so that the query subscription 141 is not deleted from the event producers 110. In response to the renew call 171, the event producer manager 108 may publish a status message 166 to the response event bus 123, which is received by the data query executor 120. The data query executor 120 may publish the status message 166 on the delivery event bus 121 so that the transport engine 122 can deliver the status message 166 to the client application 126.

The computing device 124 may be a mobile computing device (e.g., a smart phone, a PDA, a tablet, or a laptop computer) or a non-mobile computing device (e.g., a desktop computing device). The computing device 124 also includes various network interface circuitry, such as for example, a mobile network interface through which the computing device 124 can communicate with a cellular network, a Wi-Fi network interface with which the computing device 124 can communicate with a Wi-Fi base station, a Bluetooth network interface with which the computing device 124 can communicate with other Bluetooth devices, and/or an Ethernet connection or other wired connection that enables the computing device 124 to access the network 150.

The server computer 102 may be a single computing device or may be a representation of two or more distributed computing devices communicatively connected to share workload and resources. The server computer 102 may include at least one processor and a non-transitory computer-readable medium that stores executable instructions that when executed by the at least one processor cause the at least one processor to perform the operations discussed herein.

Figure 7:
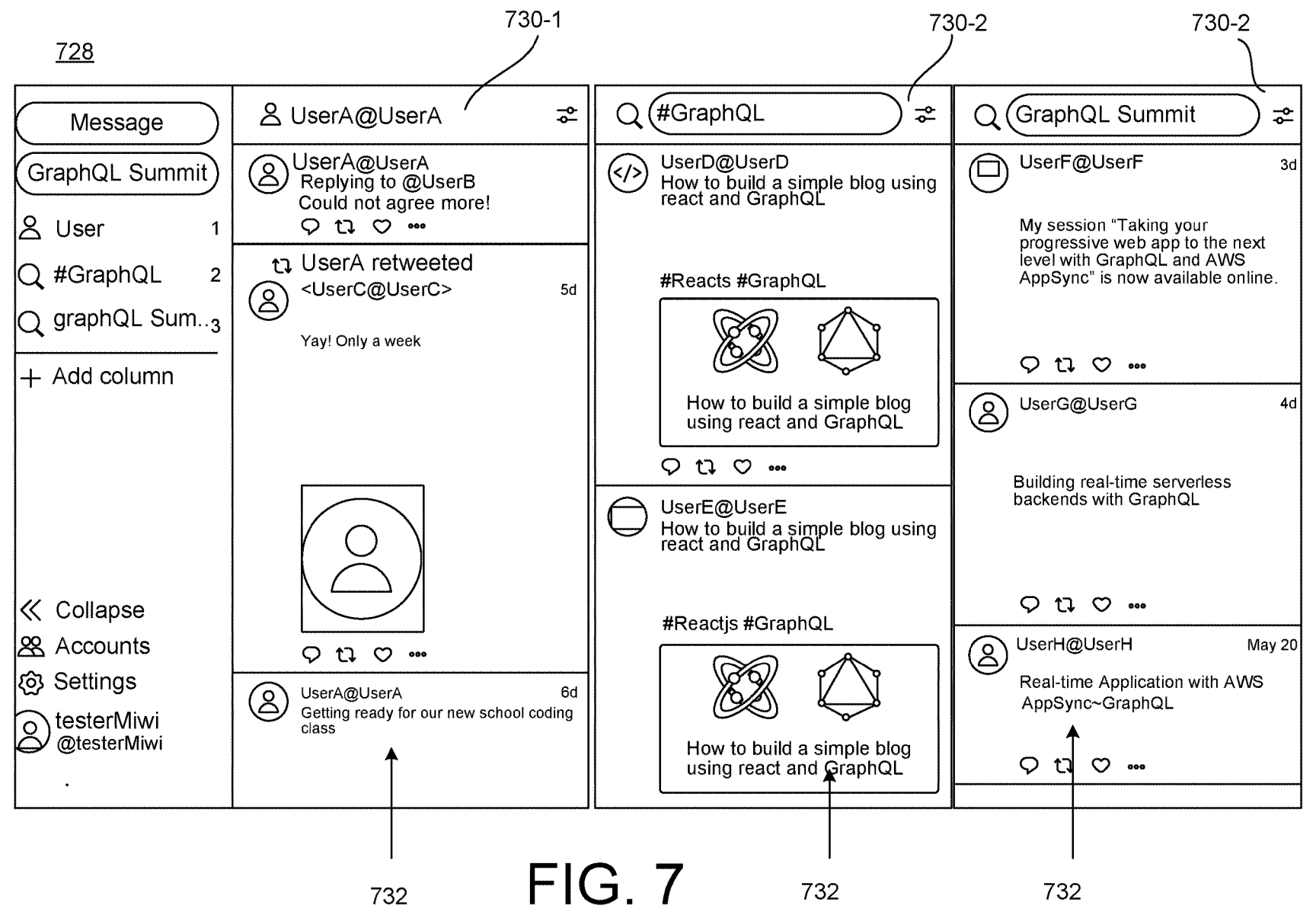

FIG. 7 illustrates an example of the user interface 728 of the client application 126 of FIG. 1 according to an aspect. The description of FIG. 7 also references components and messages explained with reference to FIGS. 1 through 6. In some examples, the client application 126 is configured to display multiple timelines as separate columns. For example, the user may add or remove columns, thereby adding or removing timelines. In some examples, the addition of a column that specifies a search initiates a query subscription 141. In some examples, the removal of a column causes the query subscription 141 to expire. In some examples, the user may add a first column that provides a first timeline 730-1. The first timeline 730-1 may display messages 732 generated by a certain user (e.g., user A) while the query subscription 141 remains active. For example, while the first column is displayed, any messages 732 generated by user A are displayed on the first timeline 730-1. For example, user A may post a message 732 to the messaging platform 104 at a certain time, and the message 732 may be pushed to the first timeline 130-1 around the time that the message 732 was posted such that the user can view the newly created message 732 by user A in real-time or near real-time. In some examples, the first timeline 730-1 is rendered in chronological order so that the newly created message 732 is pushed to the top of the first timeline 730-1.

In some examples, the user may add a second column that provides a second timeline 730-2 of messages 732 that match the hashtag #GraphQL. For example, the addition of the second column indicating the search term "#GraphQL" initiates a query subscription 141. The second timeline 730-2 may display messages 732 that include content having the search term "#GraphQL." For example, while the second column is displayed, any messages 732 exchanged on the messaging platform 104 that include the search term "#GraphQL" are streamed to the second timeline 730-2. In some examples, the second timeline 730-2 is rendered in chronological order so that a newly created message 732 that includes the search term "#GraphQL" is pushed to the top of the second timeline 730-2.

In some example, the user may add a third column that provides a third timeline 730-3 of messages 732 that include the search term "GraphQL Summit". For example, the addition of the third column indicating the search term "GraphQL Summit" initiates a query subscription 141. The third timeline 730-3 may display messages 732 that include content that match the search term "GraphQL Summit." For example, while the third column is displayed, any messages 732 that match the search term "GraphQL Summit" are streamed to the third timeline 730-3 while the query subscription 141 remains active. In some examples, the third timeline 730-3 is rendered in chronological order so that a newly created message 732 that includes the search term "GraphQL Summit" is pushed to the top of the third timeline 730-3.

Figure 8:
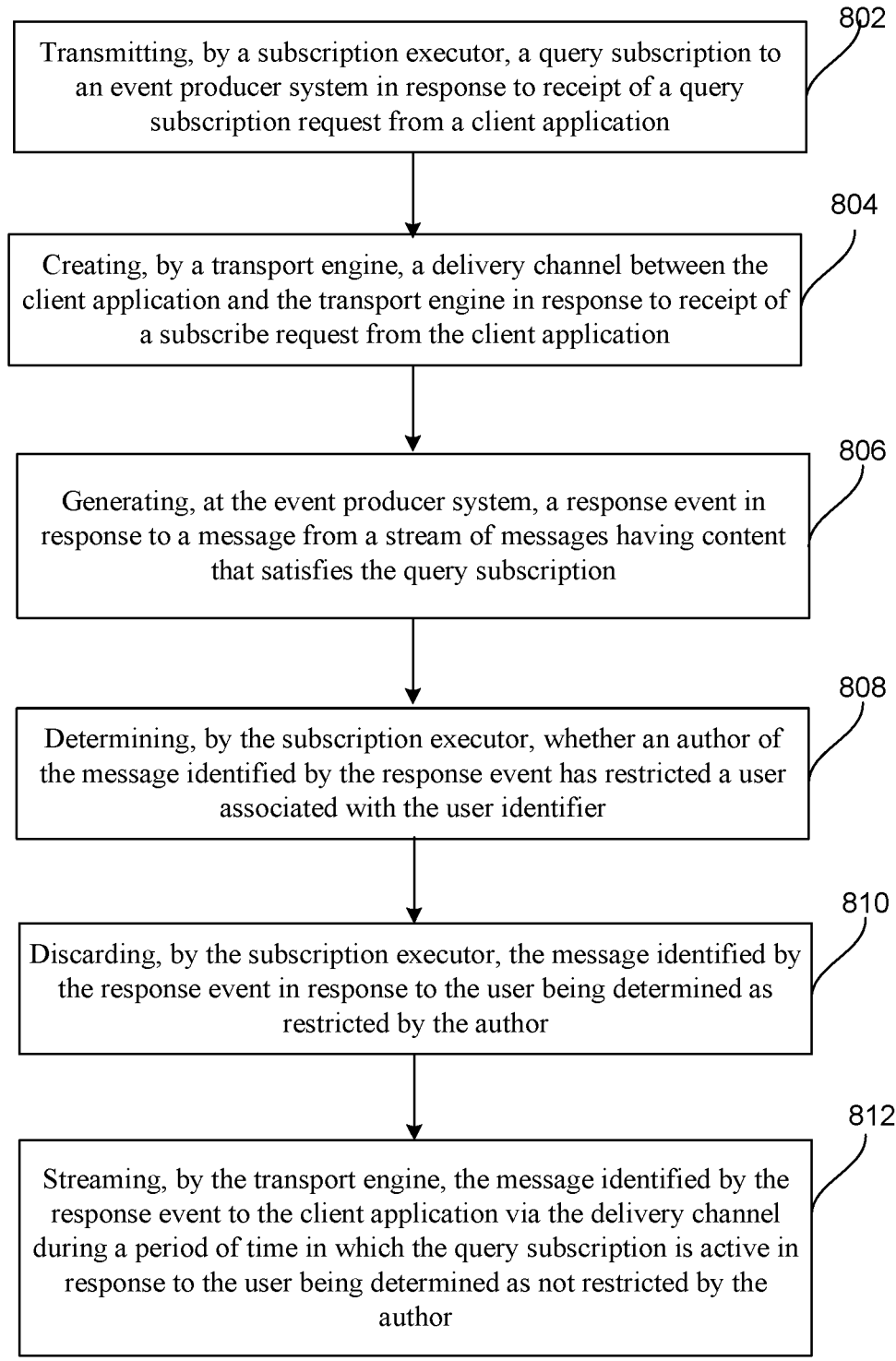
FIG. 8 illustrates a flowchart depicting example operations of a messaging platform for streaming messages according to query subscriptions according to an aspect.

FIG. 8 illustrates a flowchart 800 depicting example operations of the messaging platform 104 for streaming real-time messages 132 according to query subscriptions 141 according to an aspect. The flowchart 800 is described with reference to the system 100 of FIGS. 1 through 6.

Operation 802 includes transmitting, by a subscription executor 116, a query subscription 141 to an event producer system 106 in response to receipt of a query subscription request 140 from a client application 126. For example, the data query API 118 may receive the query subscription request 140 over the network 150 from the client application 126, and the data query API 118 may generate the query subscription 141. The data query API 118 may send the query subscription 141 to the event producer manager 108. In some examples, the query subscription request 140 is a GraphQL subscription query, where the data query API 118 is a GraphQL API and the data query executor 120 is a GraphQL executor. In some examples, the query subscription request 140 includes a query term 144 and a user identifier 146. In some examples, the data query API 118 may identify a transport topic 134 in response to the query subscription request 140.

Operation 804 includes creating, by a transport engine 122, a delivery channel 125 between the client application 126 and the transport engine 122 in response to receipt of a subscribe request 154 received over the network 150 from the client application 126. For example, the transport engine 122 may receive the subscribe request 154 over the network 150 from the client application 126 and create the delivery channel 125 in response to receipt of the subscribe request 154.

Operation 806 includes generating, at the event producer system 106, a response event 156 in response to a message from a message stream 114 having content that satisfies the query subscription 141. For examples, the event producer manager 108 may assign the query subscription 141 to one or more event producers 110, where each event producer 110 generates a response event 156 when a message from the message stream 114 satisfies the query subscription 141.

Operation 808 includes determining, by the subscription executor 116, whether an author of the message identified by the response event 156 has restricted (e.g., blocked or muted) a user associated with the user identifier 146, and operation 810 includes discarding, by the subscription executor 116, the message identified by the response event 156 in response to the user being determined as restricted by the author. For example, during message hydration, the subscription executor 116 may discard a response event 156 if the subscription executor 116 determines that the message 132 identified by the message identifier 158 violates a visibility rule, thereby improving the security of the messaging platform 104 while being able to deliver real-time messages 132 to the client application 126. For example, if the response event 156 identifies a message 132 authored by a user that restricted (e.g., blocked or muted) the user identified by the user identifier 146, the subscription executor 116 may discard the response event 156

Operation 812 includes streaming, by the transport engine 122, the messages 132 to a user interface 128 of the client application 126 via the delivery channel 125 during a period of time in which the query subscription 141 is active in response to the user being determined as not restricted by the author. For example, as the transport engine 122 receives the delivery events 160, the transport engine 122 streams the messages 132 (that do not violate visibility rules), over the network 150, to the client application 126.

Figure 9:
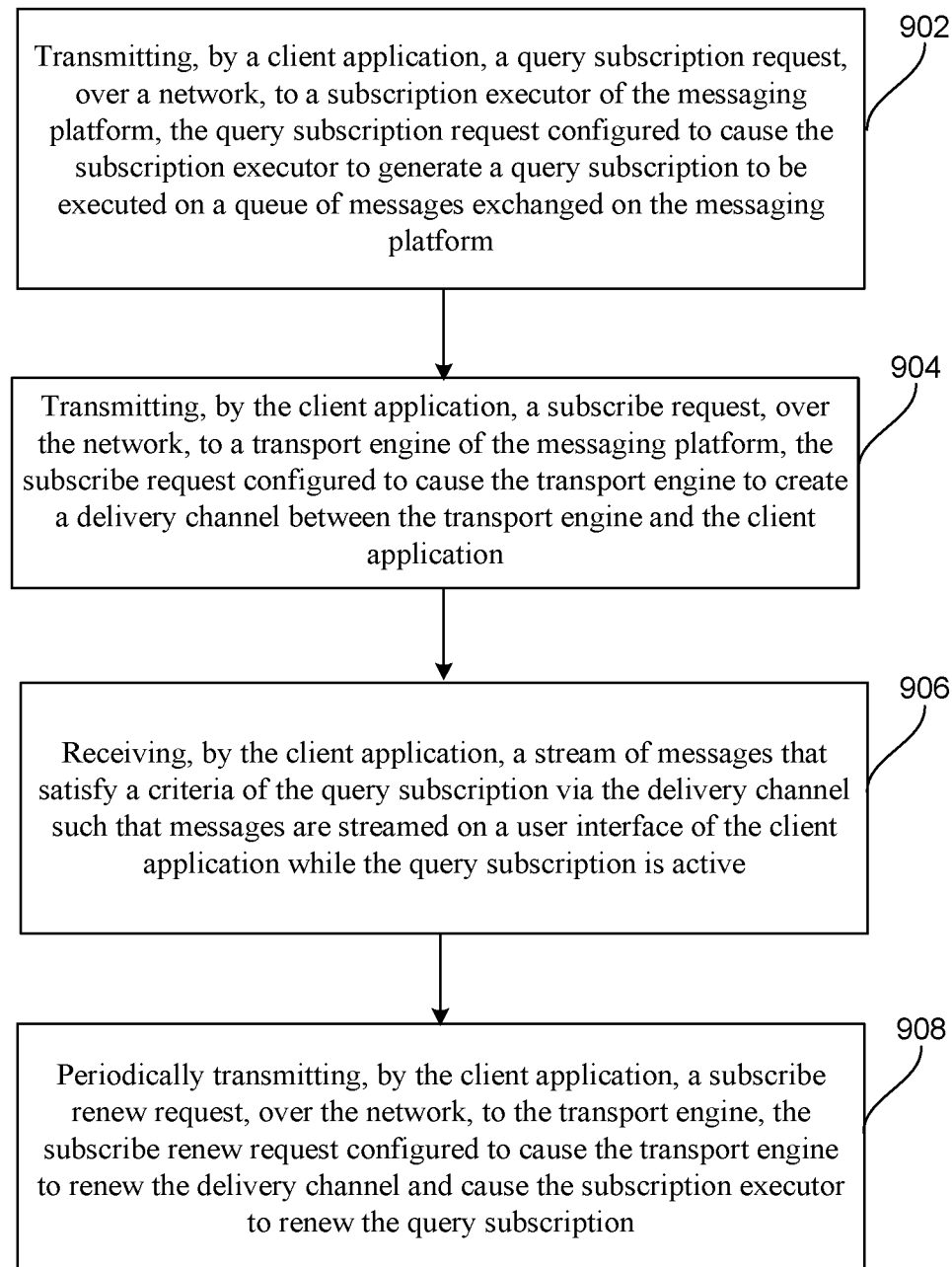
FIG. 9 illustrates a flowchart depicting example operations of a client application for steaming messages according to query subscriptions according to an aspect.

FIG. 9 illustrates a flowchart 900 depicting example operations of the client application 126 for generating an active query on the messaging platform 104 and receiving a stream of messages 132 that match the active query according to an aspect. The flowchart 800 is described with reference to the system 100 of FIGS. 1 through 6.

Operation 902 includes transmitting, by a client application 126, a query subscription request 140, over a network 150, to a subscription executor 116 of the messaging platform 104, where the query subscription request 140 is configured to cause the subscription executor 116 to generate a query subscription 141 to be executed on a message queue 112 of messages exchanged on the messaging platform 104.

Operation 904 includes transmitting, by the client application 126, a subscribe request 154, over the network 150, to a transport engine 122 of the messaging platform 104, where the subscribe request 154 is configured to cause the transport engine 122 to create a delivery channel 125 between the transport engine 122 and the client application 126.

Operation 906 includes receiving, by the client application 126, a stream of messages 132 that satisfy criteria of the query subscription 141 via the delivery channel 125 such that the messages 132 are streamed on a user interface 128 of the client application 126 over time while the query subscription 141 is active.

Operation 908 includes periodically transmitting, by the client application 126, a subscribe renew request 161, over the network 150, to the transport engine 122, where the subscribe renew request 161 configured to cause the transport engine 122 to renew the delivery channel 125 and cause the subscription executor 116 to renew the query subscription 141.

For example, in response to the subscribe renew request 161, the transport engine 122 may provide the transport topic data 162 to the data query executor 120. In response to the transport topic data 162, the data query executor 120 may transmit the renew call 171 to the event producer system 106. The event producer manager 108 may receive the renew call 171 and update the expiration time 148 so that the query subscription 141 is not deleted from the event producers 110. In response to the renew call 171, the event producer manager 108 may publish a status message 166 to the response event bus 123, which is received by the data query executor 120. The data query executor 120 may publish the status message 166 on the delivery event bus 121 so that the transport engine 122 can deliver the status message 166 to the client application 126. As such, the client application 126 may renew with only the transport engine 122, and, as described below, the structure of the messaging platform 104 may cause the query subscription 141 to be renewed at the transport engine 122 and the subscription executor 116, thereby decreasing the amount of communication transmitted between the client application 126 and the messaging platform 104 to maintain the query subscription 141.

Figure 10A:
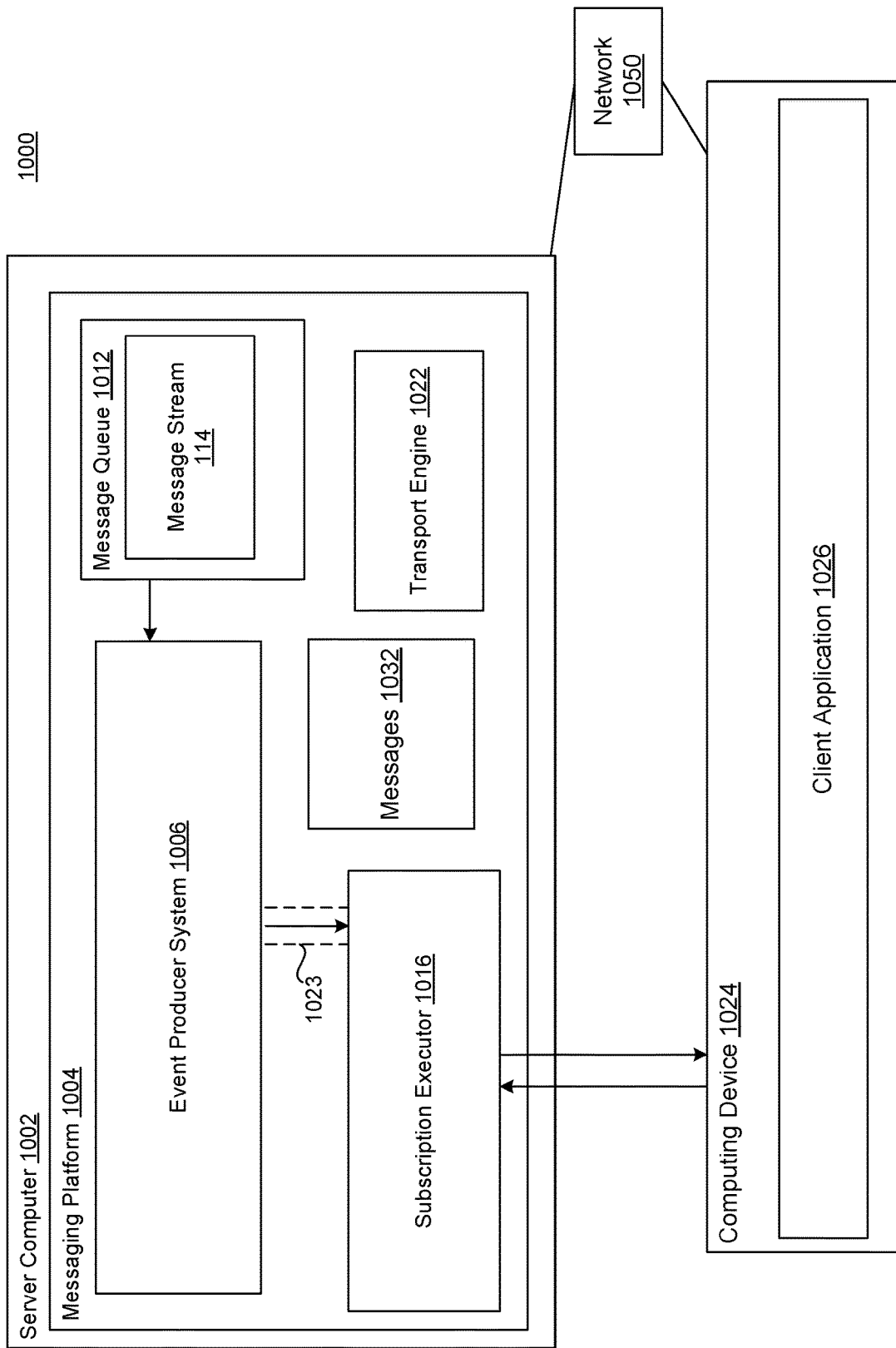
FIG. 10A illustrates a schematic diagram of a system for streaming real-time messages over time to client applications according to query subscriptions that match content from a message stream having messages exchanged on a messaging platform according to an aspect.
Figure 10B:
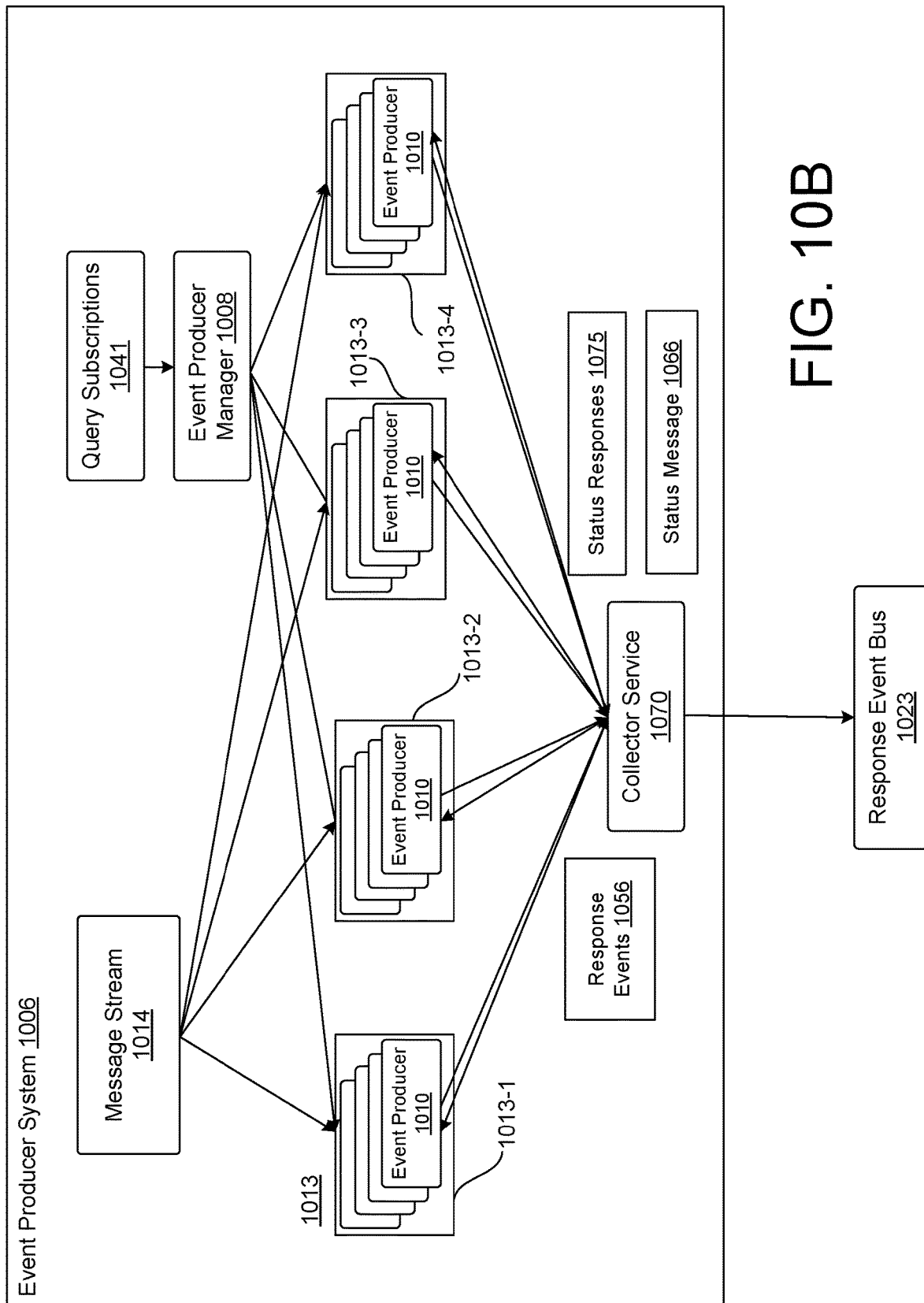
FIG. 10B illustrates an example of an event producer system according to an aspect.

FIG. 10A is a schematic diagram of a system 1000 including a messaging platform 1004 executable by one or more server computers 1002, and a client application 1026 executable by a computing device 1024 according to an aspect. The messaging platform 1004 is configured to stream, over a network 1050, real-time messages 1032 to a client application 1026 according to query subscriptions 1041 that match content from a large message stream 1014 of messages exchanged on the messaging platform 1004. The messaging platform 1004 includes an event producer system 1006, a message queue 1012 having a message stream 114, a subscription executor 1016, and a transport engine 1022. FIG. 10B illustrates the event producer system 1006 in greater detail. The system 1000 may be an example of the system 100 of FIGS. 1 through 6 and may include any of the features discussed with reference to the previous figures.

The event producer system 1006 includes an event producer manager 1008, event producers 1010 communicatively connected to the event producer manager 1008, and a collector service 1070 communicatively connected to the event producers 1010. The event producer manager 1008 obtain query subscriptions 1041 and configured the event producers 1010 to match content from a message stream 1014 according to the criteria of the query subscriptions 1041.

In some examples, the event producer manager 1008 is an API configured to receive a query subscription 1041 via a thrift request. In some examples, the event producer manager 1008 is configured to receive a query subscription 1041 from the subscription executor 1016. The query subscription 1041 may define criteria that is used to identify messages from the message stream 1014. In some examples, the query subscription 1041 is a GraphQL query subscription. The query subscription 1041 includes subscription data that provides information about the query subscription 1041. In some examples, the query subscription 1041 includes one or more query terms, a user identifier, an expiration time, and/or a subscription identifier.

The event producers 1010 are arranged in event producer groups 1013 to execute a relatively large number of query subscriptions 1041 against the message stream 1014. For example, the event producer system 1006 may include a plurality of event producer groups 1013 such as a first event producer group 1013-1, a second event producer group 1013-2, a third event producer group 1013-3, and a fourth event producer group 1013-4. Although four event producer groups 1013 are illustrated in FIG. 10B, the event producer groups 1013 may include any number of event producer groups 1013. Each event producer group 1013 is configured to receive the full message stream 1014. In other words, each event producer group 1013 is configured to independently monitor the full message stream 1014. Each event producer group 1013 includes a plurality of event producers 1010. Although FIG. 10B illustrates four event producers 1010 within each event producer group 1013, each event producer group 1013 may include any number of event producers 1010, which may be the same or different numbers across event producer groups 1013.

Each event producer 1010 within a respective event producer group 1013 may receive a separate portion of the message stream 1014. For example, the message stream 1014 is divided (e.g., equally divided or unequally divided) among the event producers 1010 within a particular event producer group 1013. For example, if there are four event producers 1010 within the first event producer group 1013-1, a first event producer receives a first portion of the message stream 1014, a second event producer receives a second portion of the message stream 1014, a third event producer receives a third portion of the message stream 1014, and a fourth event producer receives a fourth portion of the message stream 1014, where the first through fourth portions cover the entire message stream 1014.

Each event producer group 1013 is allocated a portion of the query subscriptions 1041. For example, if there are one hundred query subscriptions 1041, twenty-five query subscriptions 1041 may be allocated to the first event producer group 1013-1, twenty-five query subscriptions 1041 may be allocated to the second event producer group 1013-2, twenty-five query subscriptions 1041 may be allocated to the third event producer group 1013-3, and twenty-five query subscriptions 1041 may be allocated to the third event producer group 1013-3. However, it is noted that the number of query subscriptions 1041 may be in the thousands or millions.

The event producer manager 1008 may receive the query subscription 1041 and assign the query subscription 1041 to at least one of the event producer groups 1013. In some examples, the event producer manager 1008 assigns the query subscription 1041 to an event producer group 1013 based on a user identifier of the query subscription 1041. In some examples, the event producer manager 1008 is configured to execute a modulo operation using the user identifier and assign the query subscription 1041 based on the results of the modulo operation. The query subscription 1041 is stored at each of the event producers 1010 within the assigned event producer group 1013.

In some examples, the event producer manager 1008 assigns the query subscription 1041 to two event producer groups 1013, e.g., a primary event producer group and a second event producer group. For example, the event producer manager 1008 may assign the query subscription 1041 to the first event producer group 1013-1 and the third event producer group 1013-3, where each of the event producers 1010 within the first event producer group 1013-1 and the third event producer group 1013-3 stores the query subscription 1041 in memory. In this manner, if one of the event producer groups 1013 is fails, the query subscription 1041 can still be executed by the other event producer group 1013 assigned to the query subscription 1041.

In some examples, the event producer manager 1008 is configured to monitor the number of query subscriptions 1041 being assigned and executed for each event producer group 1013 and configured to increase and/or decrease the number of event producer groups 1013 and/or the number of event producers 1010 within each event producer group 1013. For instance, in response to the number of event producers 1010 in a particular event producer group 1013 being increased, each individual event producer 1010 may receive fewer messages from the message stream 1014 to process and consequently may have more computational capacity to handle extra searches. In response to the number of event producer groups 1013 being increased, the number of search terms allocated to the event producer 1010 may be reduced.

Each event producer 1010 is configured to generate a response event 156 in response to the query subscription 1041 being matched against a message from the respective portion of the message stream 1014. As shown with respect to the previous figures, each response event 156 includes a message identifier and subscription data providing information about the query subscription 1041. Also, each event producer 1010 is configured to periodically generate status responses 1075 that indicate a health status of the query subscription 1041 at a respective event producer 1010. Each status response 1075 may indicate whether there is an error associated with executing the query subscription 1041. For example, a status response 1075 may indicate a fail status indicating that there is an error with processing the query subscription 1041 at a particular event producer 1010, or the status response 1075 may indicate an ok status indicating that the query subscription 1041 is properly functioning at the particular event producer 1010.

As indicated above, in some examples, the query subscription 1041 is associated with an expiration time. In some examples, the event producer manager 1008 is configured to monitor the amount of time that the query subscription 1041 is active at the assigned event producers 1010, and if the time exceeds the value specified by the expiration time, the event producer manager 1008 may de-activate the query subscription 1041 by instructions the assigned event producers 1010 to delete the query subscription 1041 from memory, thereby saving resources at the event producer system 1006. However, the event producer manager 1008 may receive the renew call before the expiration time expires, which renews the expiration time, thereby renewing the query subscription 1041.

The collector service 1070 is configured to receive the response events 1056 from the event producers 1010 and publish the response events 1056 to a response event bus 1023. In some examples, the collector service 1070 may determine whether the message identified by the response event has already been published to the response event bus 1023, and then discard the response event 1056 in response to the message being determined as already been published to the response event bus 1023 to avoid the duplication of messages sent to the client application. In some examples, the collector service 1070 may determine whether a number of response events 1056 within a period of time (e.g., one second) has exceeded a streaming rate threshold, and discard one or more response events 1056 (e.g., not publish one or more response events 1056 on the response event bus 123).

Also, the collector service 1070 is configured to receive the status responses 1075 from the event producers 1010 and periodically send a status message 1066 (e.g., fail, ok, and/or renew) by publishing the status message on the response event bus 1023. If the status message 1066 indicates an error, the client application 1026 may be required to transmit the query subscription request and the subscribe request to re-start the query subscription 1041. For example, the collector service 1070 may receive the status responses 1075 from the event producers 1010, determine the health status of the query subscription 1041 based on the status responses 1075, and initiate the transmission of a status message indicating the health status of the query subscription 1041.

Figure 11:
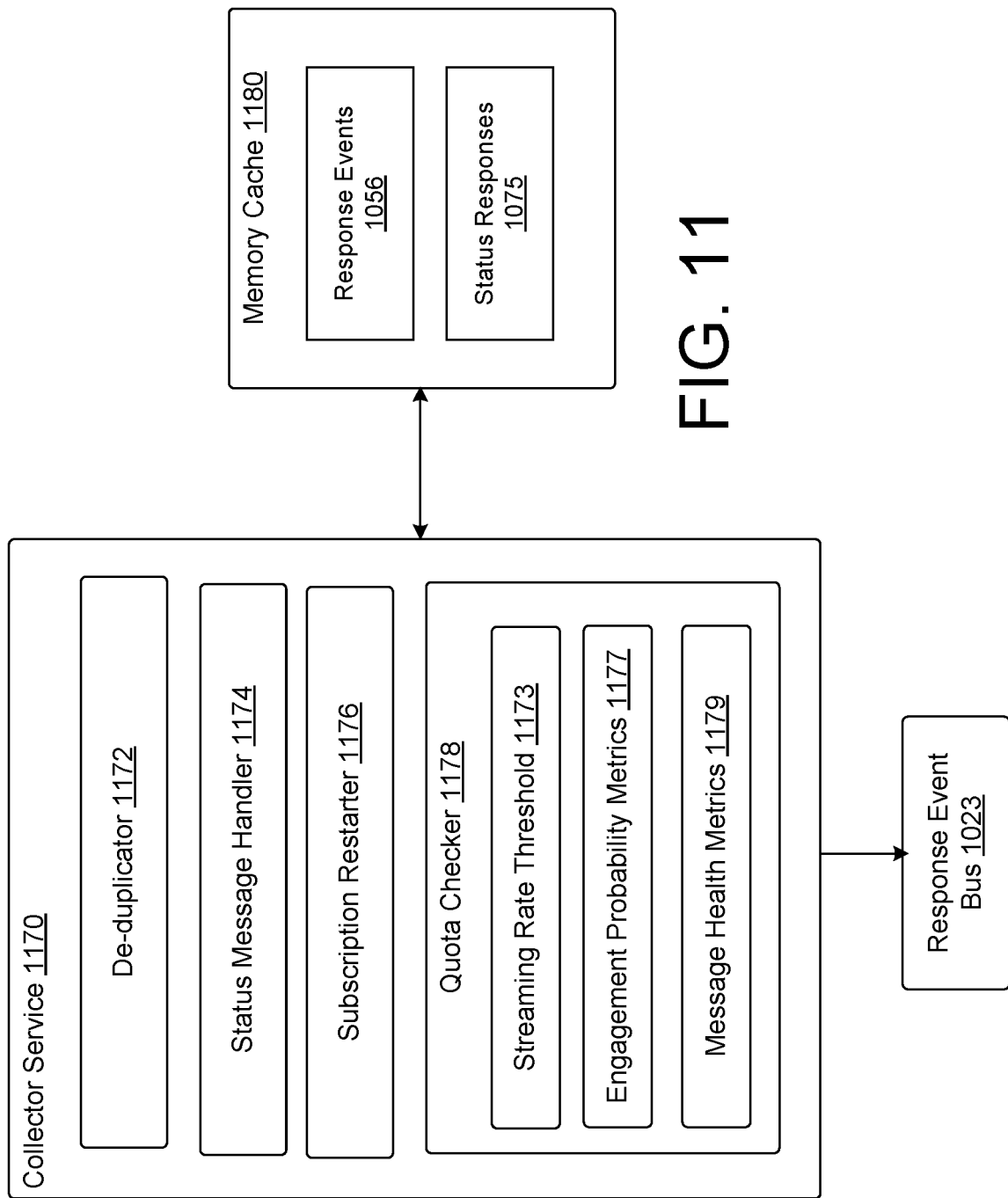
FIG. 11 illustrates an example of a collector service of the event producer system according to an aspect.

FIG. 11 illustrates an example of a collector service 1170 according to an aspect. The collector service 1170 may be an example of the collector service 1070 of FIG. 10B and may include any of the features discussed with reference to the previous figures. The collector service 1170 may operate in conjunction with a memory cache 1180 before publishing the response events 1056 to the response event bus 1023 to de-duplicate messages 1032 identified by the response events 1056 and/or decrease a streaming rate so that the messages 1032 are delivered to the client application 1026 below a streaming rate threshold 1173. In addition, the collector service 1170 may operate in conjunction with the memory cache 1180 to determine the health status of the query subscription 1041 to provide a status message 1066 to the client application 1026 or attempt to restart the query subscription 1041.

The collector service 1170 may include a de-duplicator 1172 configured to de-duplicate response events 1056 that identify messages 1032 already delivered to the client application 1026. In some examples, the query subscription 1041 is assigned to two event producer groups 1013 (each of which receives the full message stream 1014) to protect against an event producer failure, which may the event producers 1010 to identify duplicate messages 1032. However, the de-duplicator 1172 is configured to identify duplicates so that the same message is not provided to the client application 1026 multiple times.

As the collector service 1170 publishes a response event 1056 to the response event bus 1023, the collector service 1170 stores the response event 1056 in the memory cache 1180. In response to receipt of a new response event 1056, the de-duplicator 1172 determines whether a message identifier of the new response event 1056 is stored in the memory cache 1180 by querying the memory cache 1180. In response to the message identifier not being stored in the memory cache 1180 (e.g., indicating that it is not a duplicate), the collector service 1170 publishes the new response event 1056 on the response event bus 1023 and stores the new response event 1056 in the memory cache 1180. In response to the message identifier of the new response event 1056 being stored in the memory cache 1180 (e.g., indicating that it is a duplicate), the de-duplicator 1172 is configured to discard the new response event 1056.

The collector service 1170 may include a status message handler 1174 configured to determine a health status for the query subscription 1041 by querying the status responses 1075 in the memory cache 1180. For example, the collector service 1170 may receive periodically the status responses 1075 from the event producers 1010 and store the status responses 1075 in the memory cache 1180. The status message handler 1174 may periodically query the memory cache 1180 to obtain the status responses 1075 from the memory cache 1180 from the assigned event producers 1010 for a particular query subscription 1041, and then transmit a status message 1066 by publishing the status message 10066 on the response event bus 123. In some examples, if one or more of the status responses 1075 indicate a fail status, the status message 1066 may indicate a fail status, which may require the client application 1026 to re-generate the query subscription 1041 (e.g., it may be required to transmit the query subscription request and the subscribe request). If most or all of the status responses 1075 indicate an ok status, the status message 1066 may indicate an ok status.

In some examples, the collector service 1170 includes a subscription restarter 1176 configured to restart the query subscription 1041 at the event producers 1010. If the status responses 1075 indicate that there was an error with the query subscription 1041 at one or more of the event producers 1010, the subscription restarter 1176 may determine whether the query subscription 1041 is repairable based on subscription data associated with the response events 1056, and, if so, the subscription restarter 1176 may transmit the subscription data to the one or more event producers 110 reporting negative status responses 1075.

In some examples, the collector service 1170 includes a quota checker 1178 configured to discard one or more of the response events 1056 to control a streaming rate at which messages 1032 identified by the response events 1056 are delivered to the client application 1026 to be equal to or less than a streaming rate threshold 1173. In some examples, the streaming rate threshold 1173 is a value in a range of three messages per second to 20 messages per second. In some examples, the streaming rate threshold 1173 is 10 messages per second. In some examples, the quota checker 1178 is configured to discard a new response event 1056 in response to a number of previously-received response events 1056 exceeding a threshold amount over a period of time (e.g., the new response event 1056 is the eleventh message in one second and the threshold is ten messages per second). However, if the number of previously-recited response events 1056 is equal to or less than a threshold amount over a period of time, the collector service 1170 may publish the new response event 1056 to the response event bus 1023.

As indicated above, the collector service 1170 may publish the response events 1056 to the response event bus 1023 and store the published response events 1056 in the memory cache 1180. In response to a new response event 1056, the quota checker 1178 may query the memory cache 1180 to determine the number of response events 1056 stored at the memory cache 1180 over a period of time, and then discard the new response event 1056 in response to the number of response events 1056 stored in the memory cache 1180 exceeding a threshold amount over a period of time.

In some examples, the quota checker 1178 is configured to receive engagement probability metrics 1177 for messages 1032 identified by the response events 156, where the engagement probability metrics 1177 indicate predicted levels of engagement with the messages 1032. The quota checker 1178 is configured to discard one or more response events 1056 based on the engagement probability metrics 1177 such that the streaming rate is equal to or less than the streaming rate threshold 1173. For example, users may engage with the messages 1032 by favoritizing, re-sharing, and/or commenting on the messages 1032, which may be considered positive outcomes. In some examples, the messaging platform 1004 may include machine-learning resources that predict the level of positive engagement with messages 1032 to be delivered to the user (e.g., how likely will the user engage (e.g., favoritize, re-share, and/or comment) with the message 1032), and the quota checker 1178 may receive those engagement probability metrics 1177. If an engagement probability metric 1177 for a particular message 1032 is below a threshold level, the quota checker 1178 may discard that message 1032 in order to control the streaming rate. In some examples, the engagement probability metrics 1177 includes predicted negative outcomes, e.g., the probability that the user might find the message 1032 abusive. In these examples, based on the engagement probability metrics 1177, the quota checker 1178 may discard the messages 1032 having a higher likely of being considered as abusive (e.g., containing abusive content).

In some examples, the quota checker 1178 is configured to receive message health metrics 1179 for messages 1032 identified by the response events 1056, where the message health metrics 1179 indicate risk levels of violating one or more conditions of the messaging platform 1004 (e.g., abusive behavior, hateful conduct, threats, etc.). The quota checker 1178 is configured to discard one or more response events 1056 based on the message health metrics 1179 such that the streaming rate is equal to or less than the streaming rate threshold 1173.

Figure 12:
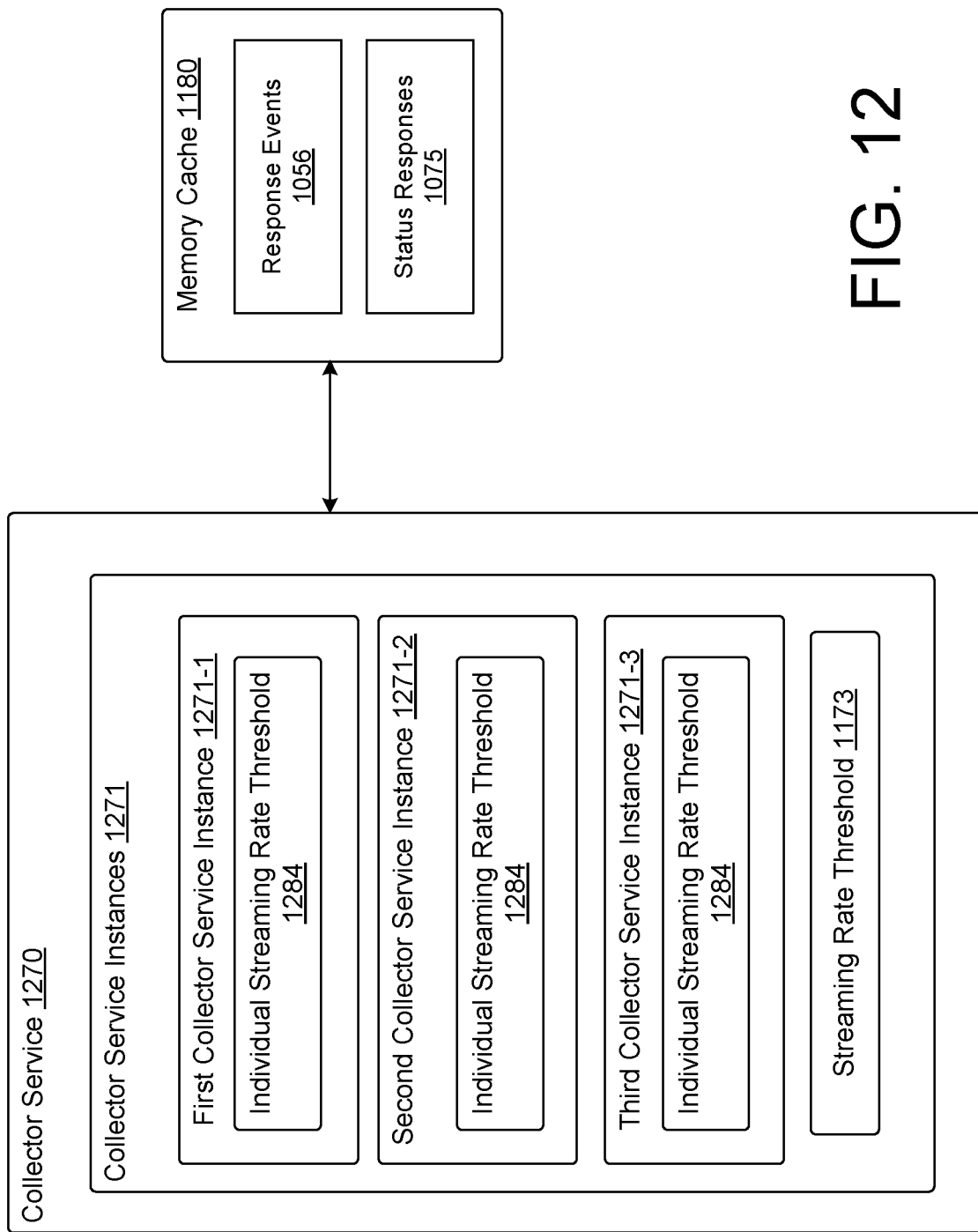
FIG. 12 illustrates an example of a collector service having multiple collector service instances according to an aspect.

FIG. 12 illustrates an example of the collector service 1270 according to an aspect. The collector service 1270 may be example of the collector service 1170 of FIG. 11 and may include any of the features described with reference to the previous figures. The collector service 1270 may include a plurality of collector service instances 1271 such as a first collector service instance 1271-1, a second collector service instance 1271-2, and a third collector service instance 1271-3. Although three collector service instances 1271 are illustrated in FIG. 12, the collector service 1270 may include any number of collector service instances 1271. Each collector service instance 1271 may receive a separate portion of the response events 1056 and/or the status responses 1075. For example, the first collector service instance 1271-1 may receive a first portion of the response events 1056 and/or the status responses 1075, the second collector service instance 1271-2 may receive a second portion of the response events 1056 and/or the status responses 1075, and the third collector service instance 1271-3 may receive a third portion of the response events 1056 and/or the status responses 1075. Each collector service instance 1271 may be a separate instance of the collector service 1170 of FIG. 11. For example, each collector service instance 1271 may perform any of the operations of the collector service 1170 of FIG. 11. For example, each of the collector service instance 1271 may include the functionalities of the de-duplicator 1172, the status message handler 1174, the subscription restarter 1176, and/or the quota checker 1178.

In some examples, the collector service 1270 is configured to perform a two-layer streaming rate adjustment process. For example, with respect to the first layer, each collector service instance 1271 may receive a separate portion of the response events 1056 and obtain a subset of response events 1056 by discarding one or more response events 1056 such that each subset includes a number of response events 10056 that is equal to or less than an individual streaming rate threshold 1284. With respect to the second layer, each collector service instance 1271 stores its subset in the memory cache 1180, and at least one of the collector service instances 1271 aggregates the subsets and discards one or more response events 1056 from the aggregated subsets such that the aggregated subsets include a number of response events 1056 that is equal to or less than the streaming rate threshold 1173.

In further detail, with respect to the first layer, the first collector service instance 1271-1 may receive the first portion of the response events 1056 and obtain a first subset of those response events 1056 by discarding one or more response events 1056 to provide a streaming rate equal to or less than the individual streaming rate threshold 1284. If the individual streaming rate threshold is four messages per second, the first collector service instance 1271-1 discards any messages beyond four within one second and stores the first subset in the memory cache 1180. The second collector service instance 1271-2 may receive the second portion of the response events 1056 and obtain a second subset of those response events 1056 by discarding one or more response events 1056 to provide a streaming rate equal to or less than the individual streaming rate threshold 1284. If the individual streaming rate threshold is four messages per second, the second collector service instance 1271-2 discards any messages beyond four within one second and stores the second subset in the memory cache 1180. Similarly, the third collector service instance 1271-3 may receive the third portion of the response events 1056 and obtain a third subset of those response events 1056 by discarding one or more response events 1056 to provide a streaming rate equal to or less than the individual streaming rate threshold 1284. If the individual streaming rate threshold is four messages per second, the third collector service instance 1271-3 discards any messages beyond four within one second and stores the third subset in the memory cache 1180.

At this point, the total number of messages is twelve, and the streaming rate threshold 1173 may be ten messages per second. With respect to the second layer, at least one of the collector service instances 1271 aggregates the first, second, and third subsets and discards one or more response events 1056 from the aggregated subsets such that the aggregated subsets include a number of response events 1056 that is equal to or less than the streaming rate threshold 1173. If the streaming rate threshold 1173 is ten messages per second, at least one of the collector service instances 1271 discards two response events 156 and publishes ten response events 1056 to the response event bus 1023.

In some examples, the collector service 1270 is configured to perform a two-layer de-duplication process. For example, with respect to the first layer, each collector service instance 1271 may receive a separate portion of the response events 156 and remove any response events 1056 identifying the same message 1032. Each collector service instance 1271 may store its respective group of the response events 1056 in the memory cache 1180. At least one of the collector service instances 1271 may query the memory cache 1180 to aggregates the groups and discard any response events 1056 that identify the same message 1032 from the aggregated groups.

Figure 13:
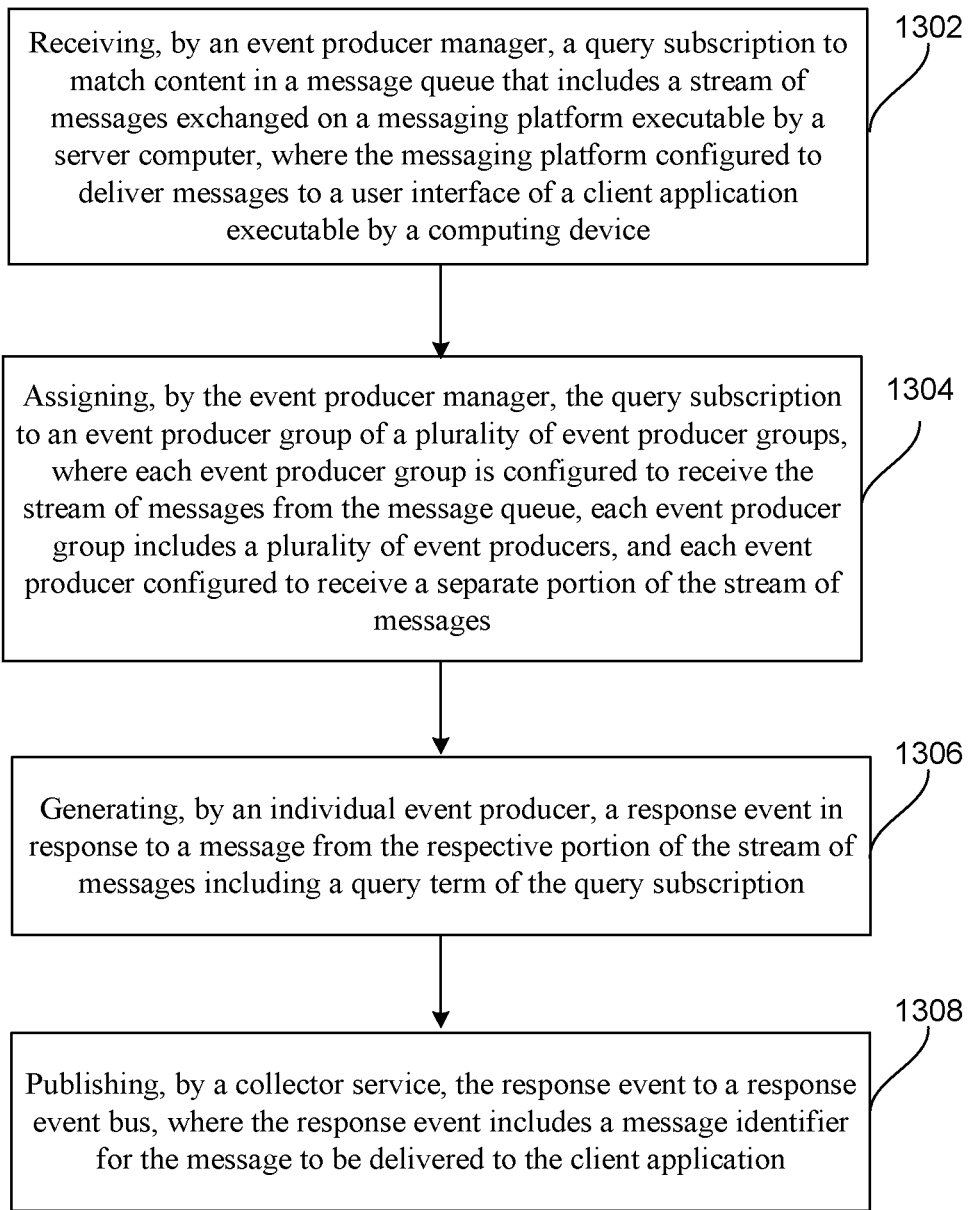
FIG. 13 illustrates a flowchart depicting example operations of an event producer system according to an aspect.

FIG. 13 illustrates a flowchart 1300 depicting example operations of the system 1000 according to an aspect. Although the flowchart is discussed with reference to the system 1000 of FIGS. 10A and 10B, the operations of FIG. 13 may be applicable to any of the systems discussed herein.

Operation 1302 includes receiving, by an event producer manager 1008, a query subscription 1041 to match content in a message queue 1012 that includes a message stream 114 of messages exchanged on a messaging platform 1004 executable by a server computer 1002, where the messaging platform 1004 configured to deliver messages 1032 to a user interface of a client application 1026 executable by a computing device. 1024

Operation 1304 includes assigning, by the event producer manager 1008, the query subscription 1041 to an event producer group 1013 of a plurality of event producer groups 1013, where each event producer group 1013 is configured to receive the message stream 1014 of messages from the message queue 1012, each event producer group 1013 includes a plurality of event producers 1010, and each event producer 1010 configured to receive a separate portion of the message stream 1014 of messages.

Operation 1306 includes generating, by an individual event producer 1010, a response event 1056 in response to a message from the respective portion of the message stream 114 of messages including a query term of the query subscription 1041.

Operation 1308 includes publishing, by a collector service 1070, the response event 1056 to a response event bus 1023, where the response event 1056 includes a message identifier for the message 1032 to be delivered to the client application 1026.

Figure 14:
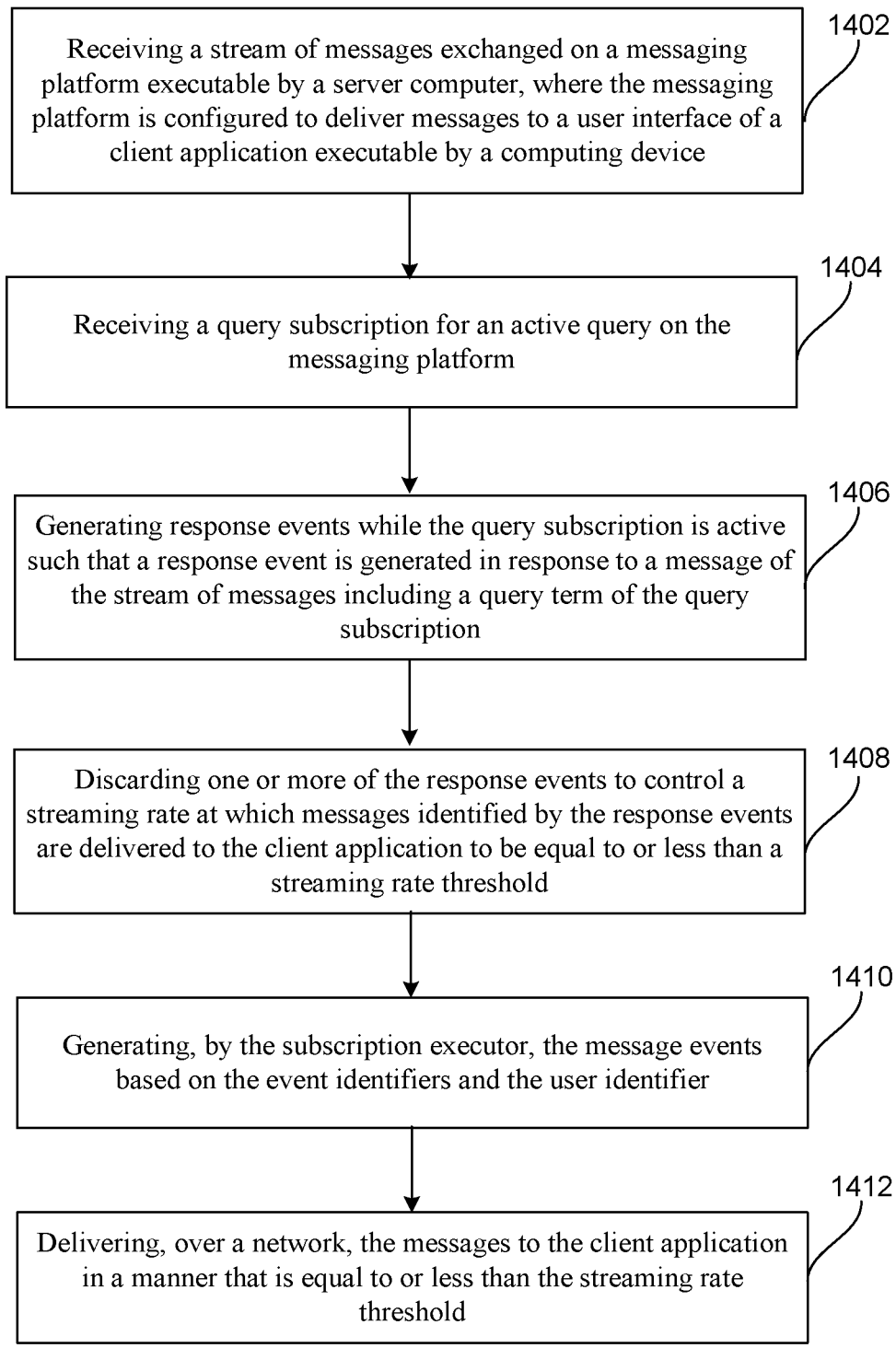
FIG. 14 illustrates a flowchart depicting example operations of a messaging platform for streaming messages below a threshold level according to an aspect.

FIG. 14 illustrates a flowchart 1400 depicting example operations of the system 1000 FIGS. 10A and 10B with the collector service 1170 of FIG. 11 and/or the collector service 1270 of FIG. 12 according to an aspect. However, the operations of FIG. 14 may be applicable to any of the systems discussed herein Operation 1402 includes receiving a message stream 1014 of messages exchanged on a messaging platform 1004 executable by a server computer 1002, where the messaging platform 1004 is configured to deliver messages 1032 to a user interface of a client application 1026 executable by a computing device 1024.

Operation 1404 includes receiving a query subscription 1041 for an active query on the messaging platform 1004.

Operation 1406 includes generating response events 1056 while the query subscription 1041 is active such that a response event 1056 is generated in response to a message of the message stream 1014 of messages including a query term of the query subscription 1041.

Operation 1408 includes discarding one or more of the response events 1056 to control a streaming rate at which messages identified by the response events 1056 are delivered to the client application 1026 to be equal to or less than a streaming rate threshold 1173.

Operation 1410 includes delivering, over a network 1050, the messages 1032 to the client application 1026 in a manner that is equal to or less than the streaming rate threshold 1173.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

What is claimed is:

1. A system for processing query subscriptions in a messaging platform for delivering real-time messages according to the query subscriptions, the system comprising:
   at least one processor; and
   a non-transitory computer-readable medium storing executable instructions that when executed by the at least one processor cause the at least one processor to:
      receive a stream of messages exchanged on the messaging platform executable by a server computer, the messaging platform configured to stream messages to a user interface of a client application executable by a computing device;
      receive a query subscription and assign the query subscription to one or more of the plurality of event producers, each event producer configured to generate a response event in response to a message from the steam of messages satisfying the query subscription;
      receive the response events from the plurality of event producers and publish the response events on a response event bus to be delivered to the client application;
      receive a status message about a status of execution of the query subscription at a respective event producer; and
      transmit subscription data stored on the messaging platform to the respective event producer to restart the query subscription in response to the status message indicating an error associated with the query subscription.

2. The system of claim 1, wherein the query subscription is received via an application programming interface (API), the executable instructions including instructions that when executed by the at least one processor cause the at least one processor to:
   assign, by the API, the query subscription to one or more of the event producers based on a user identifier associated with the query subscription.

3. The system of claim 1, wherein the executable instructions include instructions that when executed by the at least one processor cause the at least one processor to:
   monitor a number of query subscriptions processed at the plurality of event producers and a size of the stream of messages; and
   adjust a number of the plurality of event producers based on the number of query subscriptions and the size of the stream of messages.

4. The system of claim 1, wherein the executable instructions include instructions that when executed by the at least one processor cause the at least one processor to:
   assign an individual query subscription to a first event producer group and a second event producer group, the first event producer group including a plurality of event producers, each of the plurality of event producers configured to receive a separate portion of the stream of messages.

5. The system of claim 1, wherein the executable instructions include instructions that when executed by the at least one processor cause the at least one processor to:
- determine, in response to receipt of a new response event, whether the response events for the query subscription has exceeded a streaming rate threshold; and
- discard the new response event in response to the streaming rate threshold being exceeded.

6. The system of claim 1, wherein the executable instructions include instructions that when executed by the at least one processor cause the at least one processor to:
- determine, in response to a new response event, whether a message identifier of the new response event is stored in a memory cache;
- store the new response event in the memory cache in response to the message identifier not being stored in the memory cache; and
- discard the new response event in response to the message identifier being stored in the memory cache.

7. The system of claim 1, wherein the executable instructions include instructions that when executed by the at least one processor cause the at least one processor to:
- transmit, by a subscription executor, the query subscription to the event producer manager in response to receipt of a query subscription request received over a network from the client application; and
- generate, by a transport engine, a delivery channel between the transport engine and the client application in response to receipt of a subscribe request received over the network from the client application such that messages identified by the response events are streamed, via the delivery channel, to the client application during a period of time in which the query subscription is active.

8. The system of claim 7, wherein the executable instructions include instructions that when executed by the at least one processor cause the at least one processor to:
- subscribing, by the subscription executor, the response event bus;
- determine, in response to the response event being published on the response event bus, whether an author of a message identified by the response event has restricted a user associated with a user identifier of the query subscription; and
- discard the response event in response to the user being determined as restricted by the author.

9. A non-transitory computer-readable medium storing executable instructions that when executed by at least one processor are configured to cause the at least one processor to execute operations comprising:
- receive, by an event producer manager, a query subscription to match content in a stream of messages exchanged on a messaging platform executable by one or more-a server computers, the query subscription defining at least one query term;
- generate, by one or more event producers, response events while the query subscription is active such that a response event is generated in response to a messaging having the at least one query term;
- publish, by a collector service, the response events on a response event bus to be streamed to a client application executable by a user device;
- generate, by each event producer, status messages about a status of execution of the query subscription at a respective event producer; and
- transmit, by the collector service, subscription data to an event producer to restart the query subscription in response to one or more of the status messages indicating an error associated with the query subscription.

10. The non-transitory computer-readable medium of claim 9, wherein the operations comprise:
- assign the query subscription to a first group of event producers among a plurality of event producers groups based on a modulo operation inputted with a user identifier associated with the query subscription.

11. The non-transitory computer-readable medium of claim 9, wherein the operations comprise:
- determine, by the collector service, whether a number of response events within a period of time has exceeded a streaming rate threshold; and
- discard, by the collector service, one or more response events in response to the streaming rate threshold being exceeded.

12. The non-transitory computer-readable medium of claim 9, wherein the operations comprise:
- determine, by the collector service, whether a message identified by the response event has already been published to a response event bus; and
- discard the response event in response to the message being determined as already been published to the response event bus.

13. The non-transitory computer-readable medium of claim 9, wherein the operations comprise:
- transmit, by a subscription executor, the query subscription to the event producer manager in response to receipt of a query subscription request received over a network from the client application;
- generate, by a transport engine, a delivery channel between the transport engine and the client application in response to receipt of a subscribe request received over the network from the client application;
- generate, by the subscription executor, a message based on a message identifier from the response event; and
- stream, by the transport engine, the message to the client application via the delivery channel during a period of time in which the query subscription is active.

14. A method for processing query subscriptions in a messaging platform, the method comprising:
- receiving, by an event producer manager, a query subscription to match content in a stream of messages exchanged on a messaging platform executable by a server computer, the query subscription defining at least one query term;
- generating, by one or more event producers, response events while the query subscription is active such that a response event is generated in response to a message having the at least one query term;
- publishing, by a collector service, the response events to a response event bus;
- generating, by each event producer, status messages about a status of execution of the query subscription at a respective event producer; and
- transmitting, by the collector service, subscription data to an event producer to restart the query subscription in response to one or more of the status messages indicating an error associated with the query subscription.

15. The method of claim 14, further comprising:
- assigning the query subscription to a group of event producers, each event producer of the group storing the query subscription, each event producer of the group configured to receive a separate portion of the stream of messages.

16. The method of claim 14, further comprising:
  determining, before the publishing step, by the collector service, whether a number of response events within a period of time has exceeded a streaming rate threshold; and
  discarding, by the collector service, the response event in response to the streaming rate threshold being exceeded.

17. The method of claim 16, further comprising:
  determining, by the collector service, whether a message identified by the response event has already been published to the response event bus before the publishing step; and
  discarding, by the collector service, the response event in response to the message being determined as already been published to the response event bus.

18. A messaging platform, executable by one or more server computers, configured to facilitate an exchange of messages between user devices, the messaging platform comprising:
  at least one processor; and
  a non-transitory computer-readable medium storing executable instructions that when executed by the at least one processor cause the at least one processor to:
    store a stream of messages exchanged on a messaging platform executable by one or more server computers;
    transmit a query subscription to an event producer manager in response to receipt of a query subscription request received over a network from a client application executable by a user device;
    generate a delivery channel between a transport engine and the client application in response to receipt of a subscribe request received over the network from the client application;
    assign, by the event producer manager, the query subscription to one or more of a plurality of event producers, each event producer configured to generate a response event in response to a message from the steam of messages satisfying the query subscription;
    publish the response event on a response event bus;
    determine, in response to the response event being published on the response event bus, whether an author of a message identified by the response event has restricted a user associated with a user identifier of the query subscription; and
    discard the response event in response to the user being determined as restricted by the author.

* * * * *